United States Patent
Marlowe

[11] Patent Number: 5,847,897
[45] Date of Patent: Dec. 8, 1998

[54] DATA STORAGE AND RETRIEVAL SYSTEM HAVING PLURAL DATA CARTRIDGES, PLURAL DRIVE MECHANISMS EACH WITH AN ASSOCIATED TRANSFER MECHANISM HAVING A FINGER MEMBER TO FULLY INSERT A CARTRIDGE INTO ITS ASSOCIATED DRIVE

[75] Inventor: Christian P. Marlowe, Nederland, Colo.

[73] Assignee: Media Logic, Inc., Plainville, Mass.

[21] Appl. No.: 865,584

[22] Filed: May 29, 1997

Related U.S. Application Data

[63] Continuation of Ser. No. 547,713, Oct. 26, 1995, abandoned.

[51] Int. Cl.$^6$ ................................................. G11B 15/68
[52] U.S. Cl. ............................................. 360/92; 369/36
[58] Field of Search ..................... 360/92, 96.5, 98.01, 360/98.04–98.06; 369/33–39

[56] References Cited

U.S. PATENT DOCUMENTS

| | | | |
|---|---|---|---|
| 3,774,916 | 11/1973 | Nanba | 360/92 |
| 3,807,741 | 4/1974 | Uemura | 360/92 |
| 4,063,294 | 12/1977 | Burkhart | 360/92 |
| 4,287,541 | 9/1981 | Tanahashi et al. | 360/92 |
| 4,361,858 | 11/1982 | Chambers | 360/92 |
| 4,510,539 | 4/1985 | Young | 360/92 |
| 4,812,629 | 3/1989 | O'Neil et al. | 235/383 |
| 5,060,090 | 10/1991 | Kobayashi et al. | 360/92 |
| 5,067,116 | 11/1991 | Kadrmas | 369/37 |
| 5,143,193 | 9/1992 | Geraci | 194/212 |
| 5,148,332 | 9/1992 | Tomita et al. | 360/92 |
| 5,236,258 | 8/1993 | Bunch | 360/92 |
| 5,274,516 | 12/1993 | Kakuta et al. | 360/92 |
| 5,307,331 | 4/1994 | D'Alayer De Costemore D'Arc | 369/37 |
| 5,337,297 | 8/1994 | Kvifte et al. | 369/36 |
| 5,353,179 | 10/1994 | Elliott et al. | 360/92 |
| 5,395,199 | 3/1995 | Day, III et al. | 360/92 |
| 5,415,471 | 5/1995 | Dalziel | 360/92 |
| 5,429,470 | 7/1995 | Nicol et al. | 360/92 |
| 5,528,566 | 6/1996 | McGee et al. | 369/37 |
| 5,537,267 | 7/1996 | Nelson et al. | 360/92 |
| 5,555,143 | 9/1996 | Hinnen et al. | 360/92 |

FOREIGN PATENT DOCUMENTS

| | | | |
|---|---|---|---|
| 3721821 | 10/1988 | Germany | 360/92 |

*Primary Examiner*—Jefferson Evans
*Attorney, Agent, or Firm*—Fish & Richardson P.C.

[57] ABSTRACT

A data storage system is provided for storing and retrieving data. The system includes: a conveyor system for carrying a plurality of data cartridges; and, a plurality of independently operable drive mechanisms, each one having a data cartridge transfer mechanism. The conveyor system is adapted to position a selected one of the data cartridges to the transfer mechanism of a selected one of the drive mechanisms. When so positioned, the transfer mechanism removes the data cartridge and inserts it into the drive mechanism for processing (i.e., data may be written onto the data cartridge or data may be read from the data cartridge). The data cartridge may then be withdrawn from the drive mechanism after processing and returned to the conveyor system. Because each one of the drive mechanisms is operable independently of the other drives and each drive has its own transfer mechanism, more than one data cartridge may be processed during the same time period, or during overlapping time periods.

12 Claims, 27 Drawing Sheets

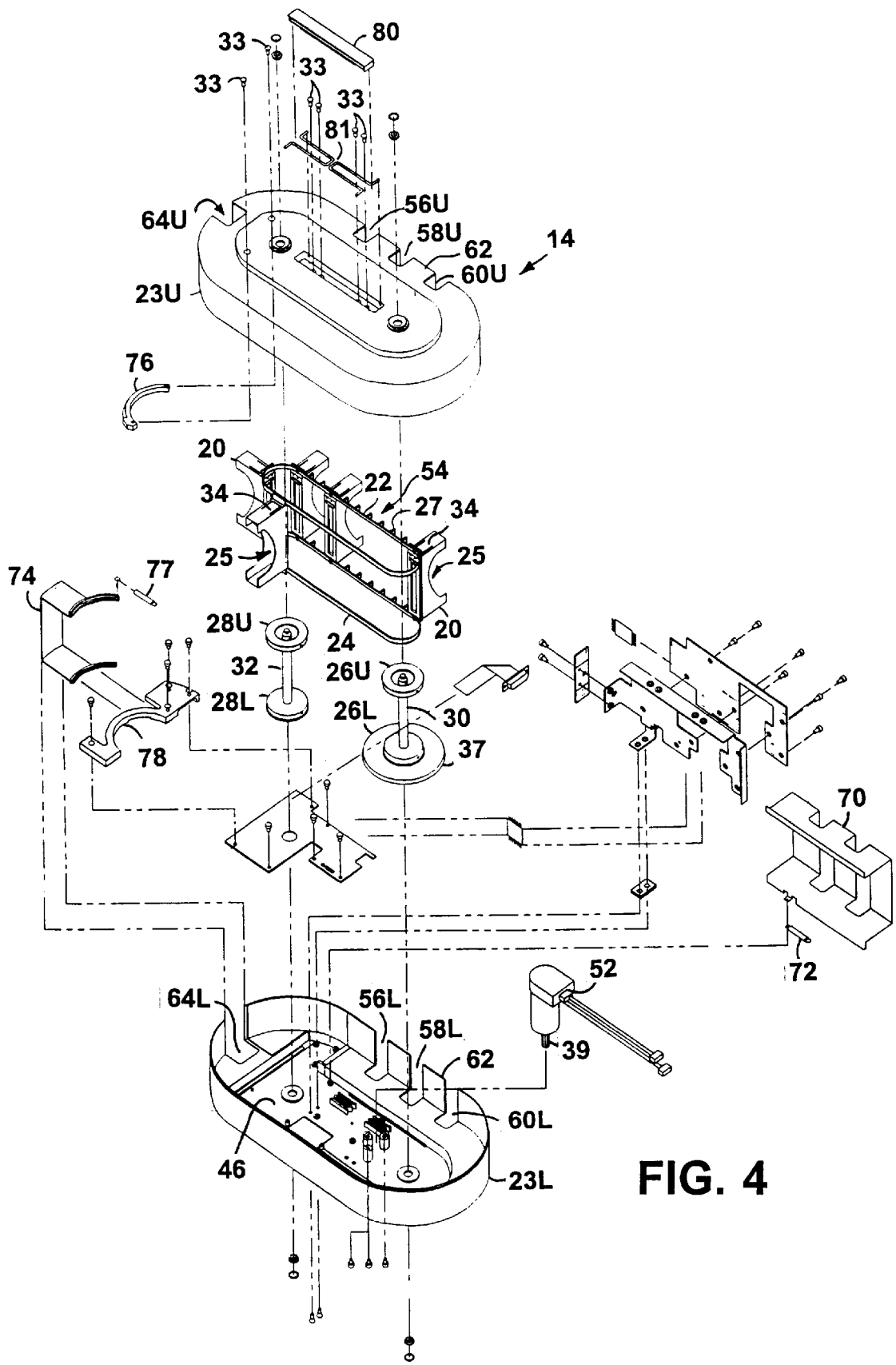

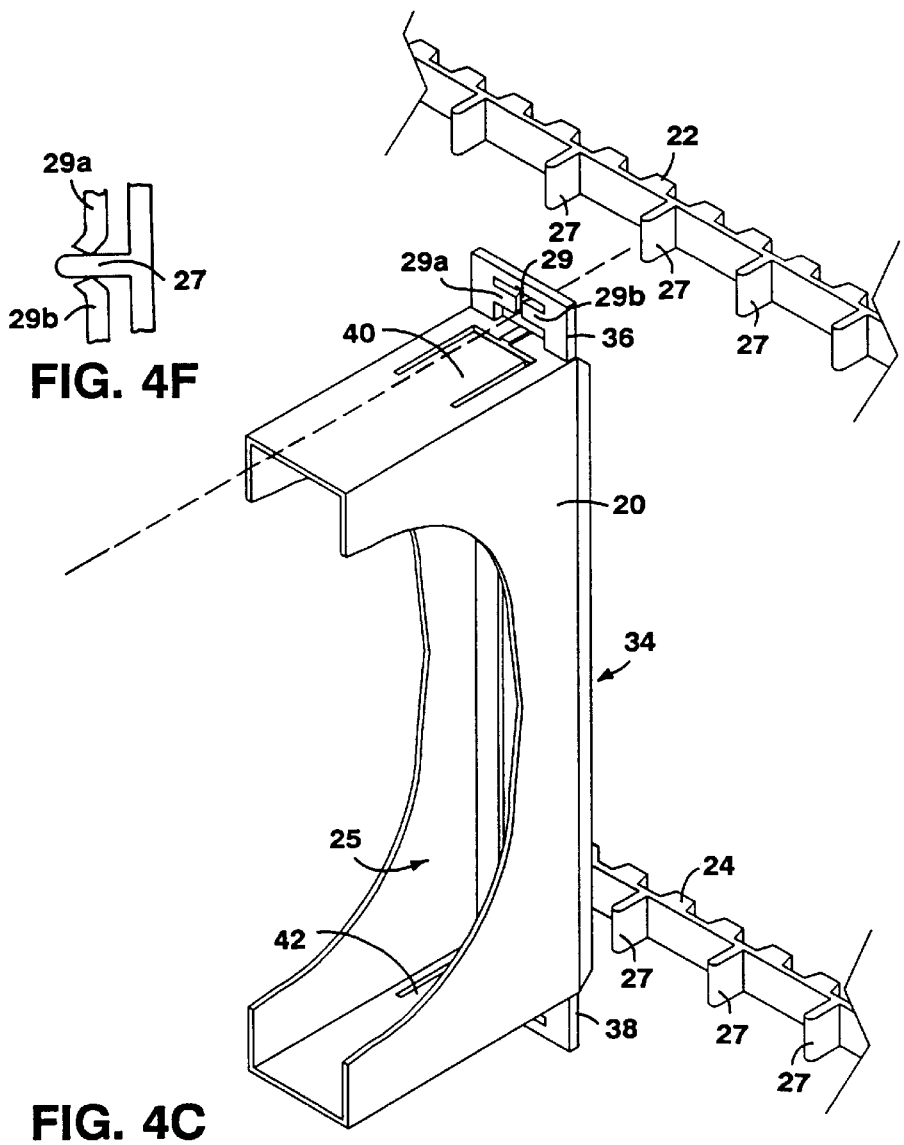
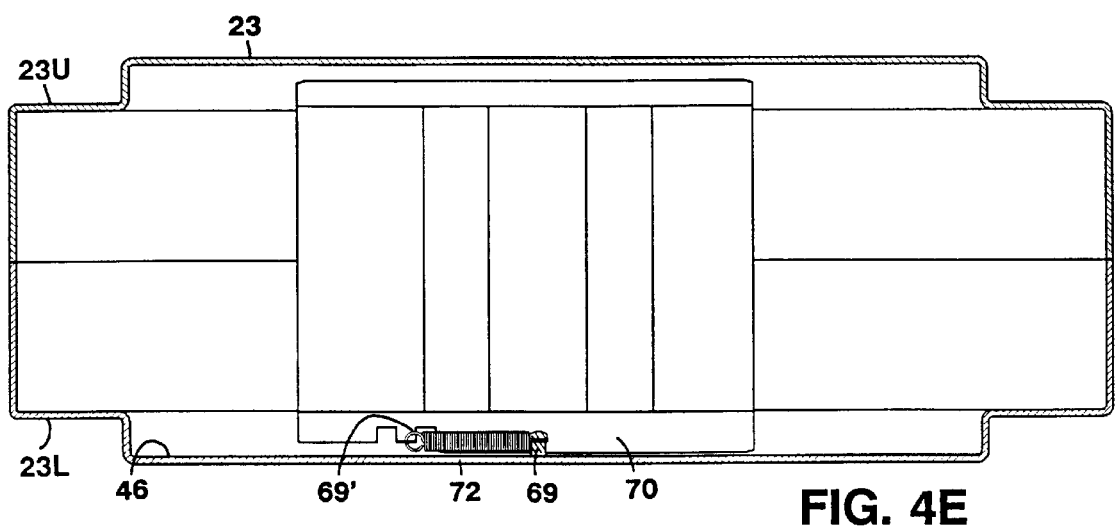

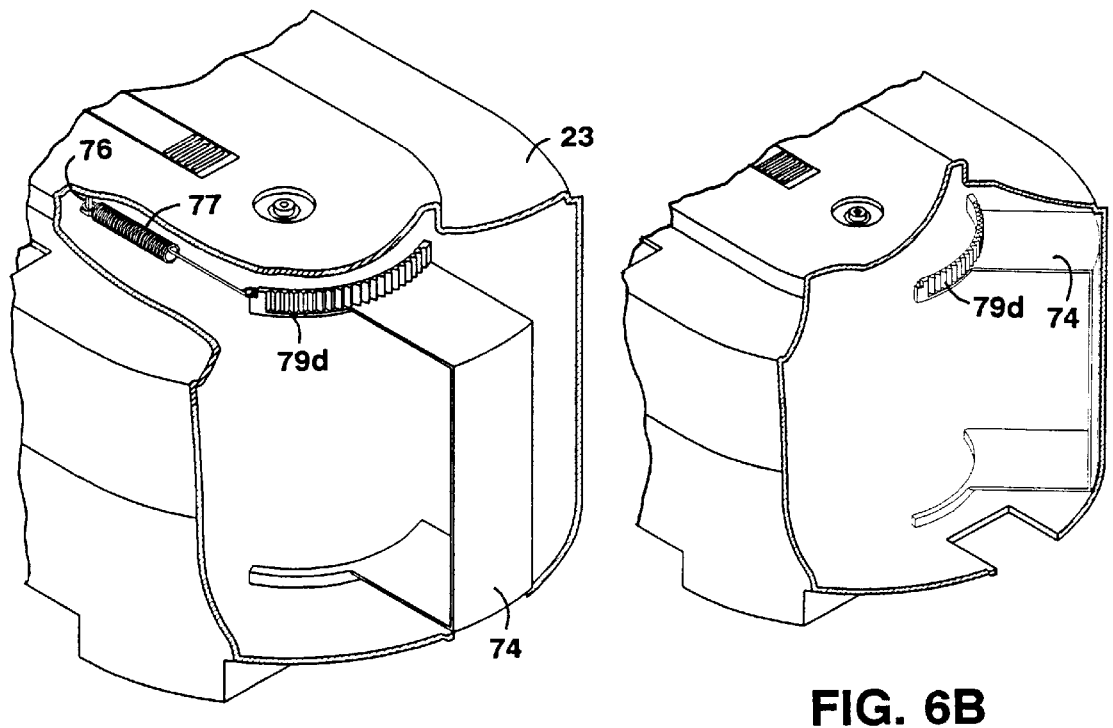
FIG. 6A
FIG. 6B
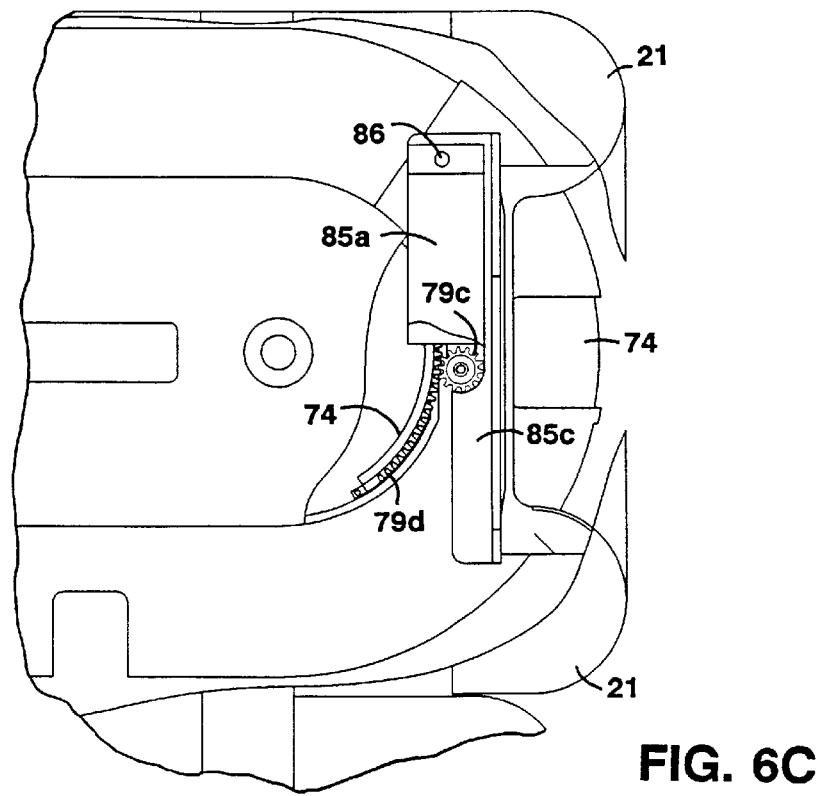
FIG. 6C

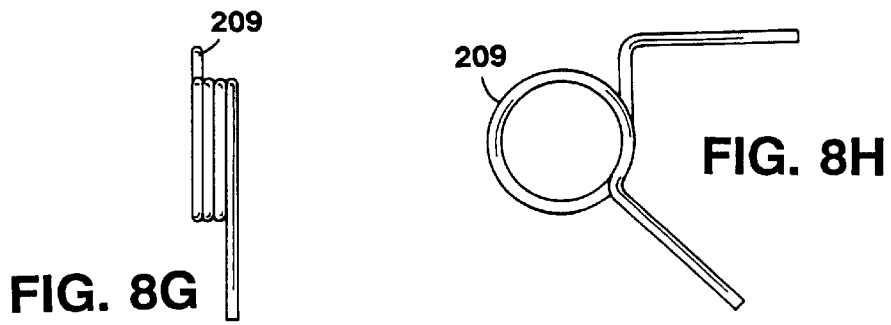
FIG. 8G
FIG. 8H
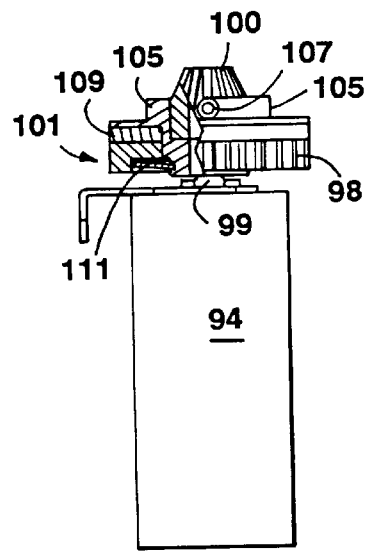
FIG. 10C
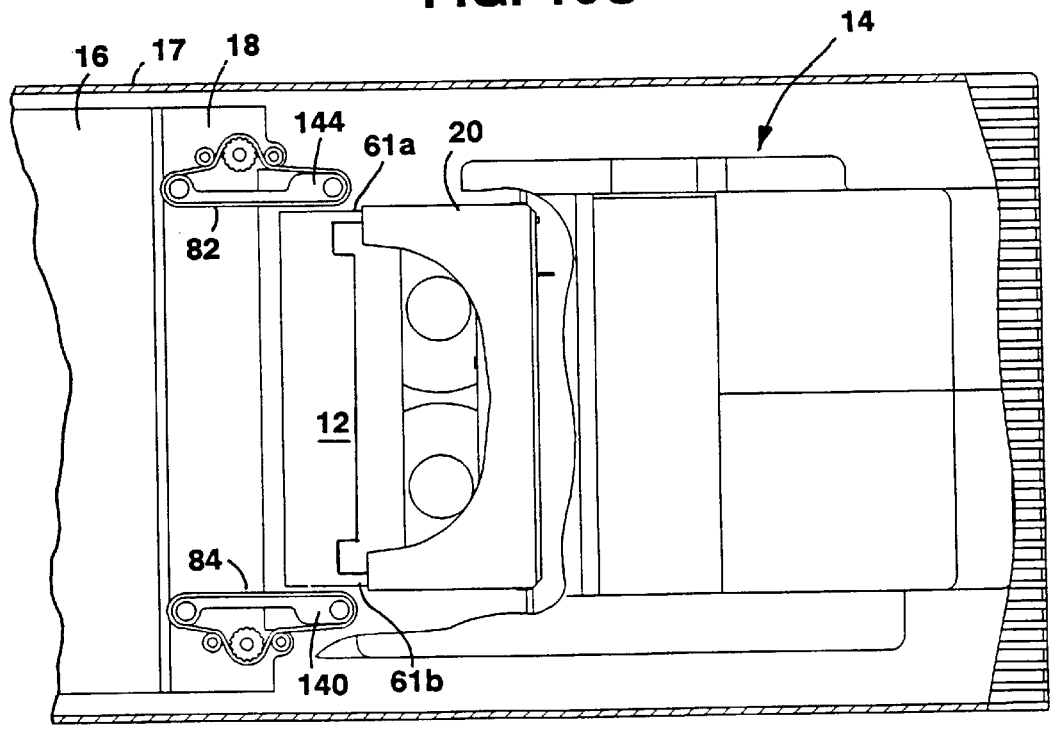
FIG. 7

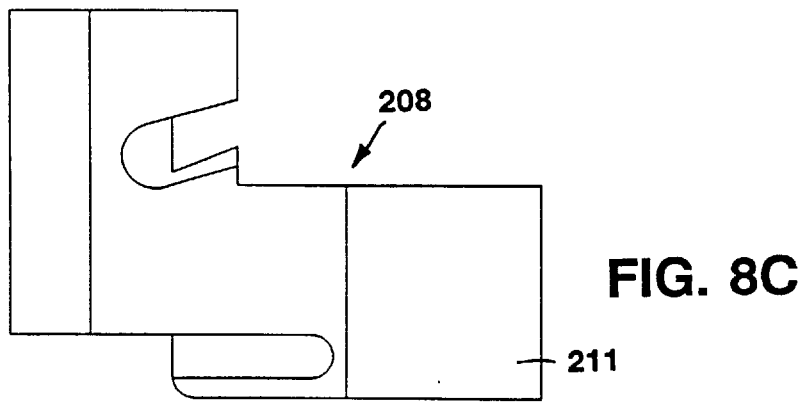
FIG. 8C
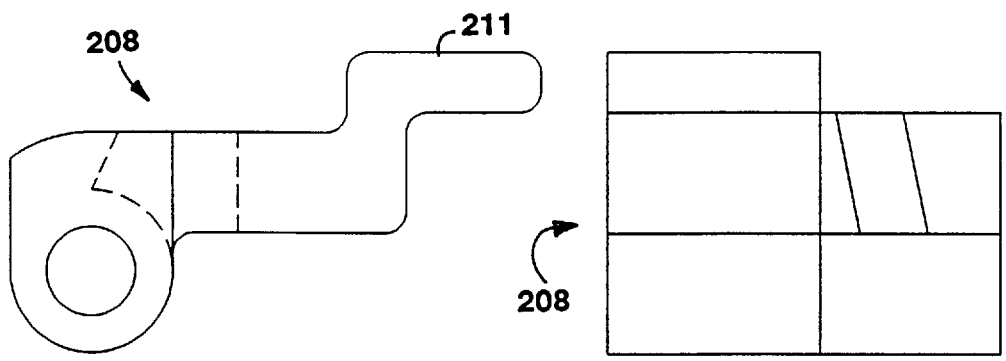
FIG. 8D  FIG. 8E
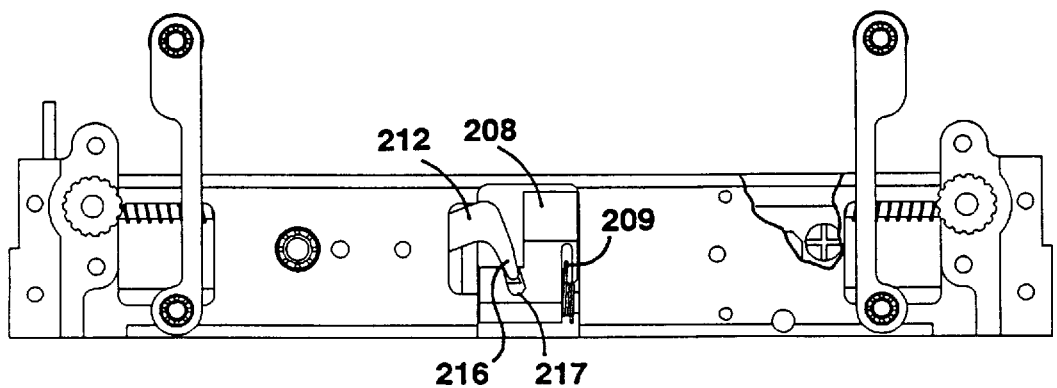
FIG. 8F

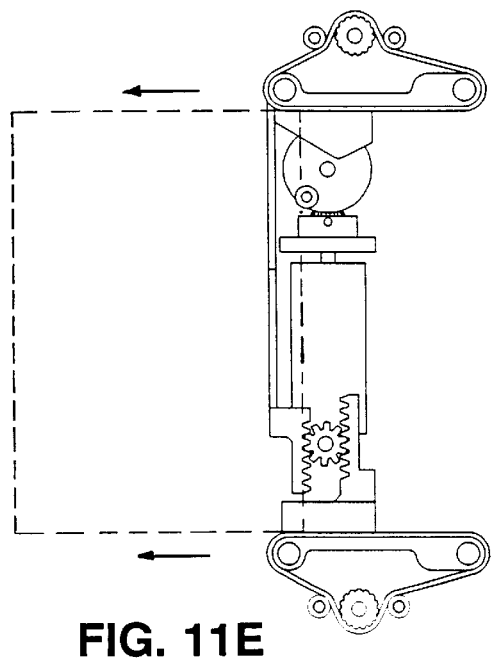
FIG. 11E
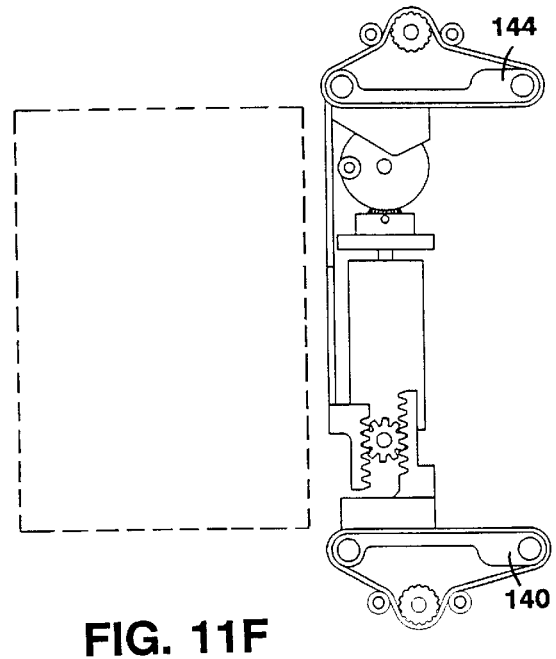
FIG. 11F
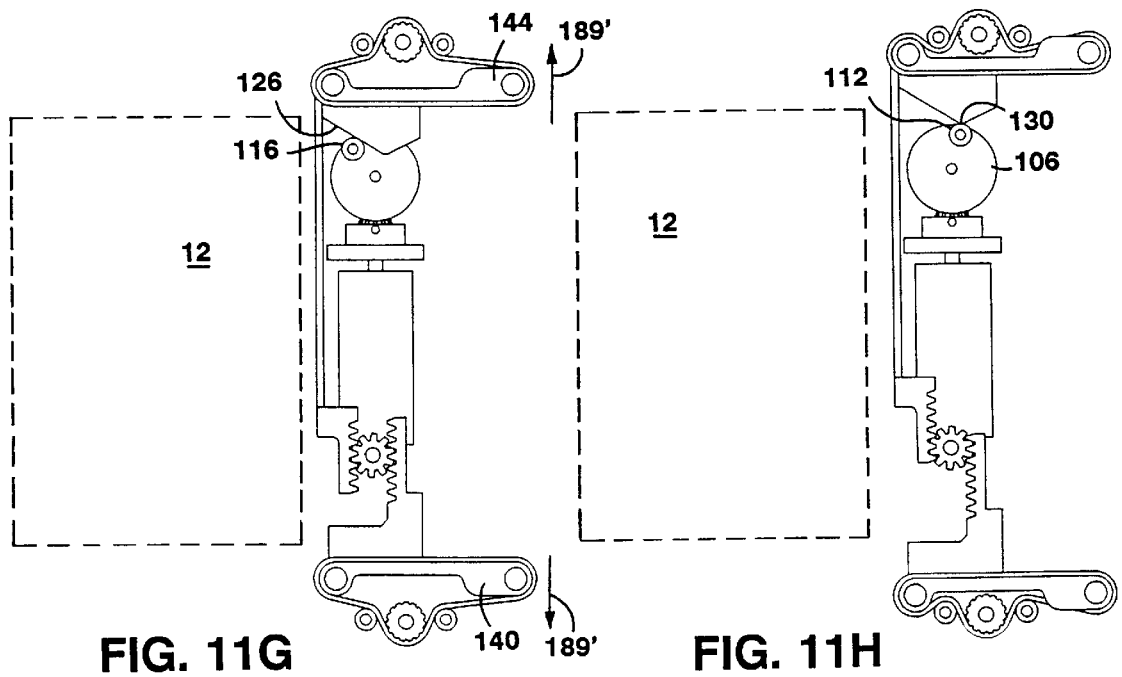
FIG. 11G
FIG. 11H

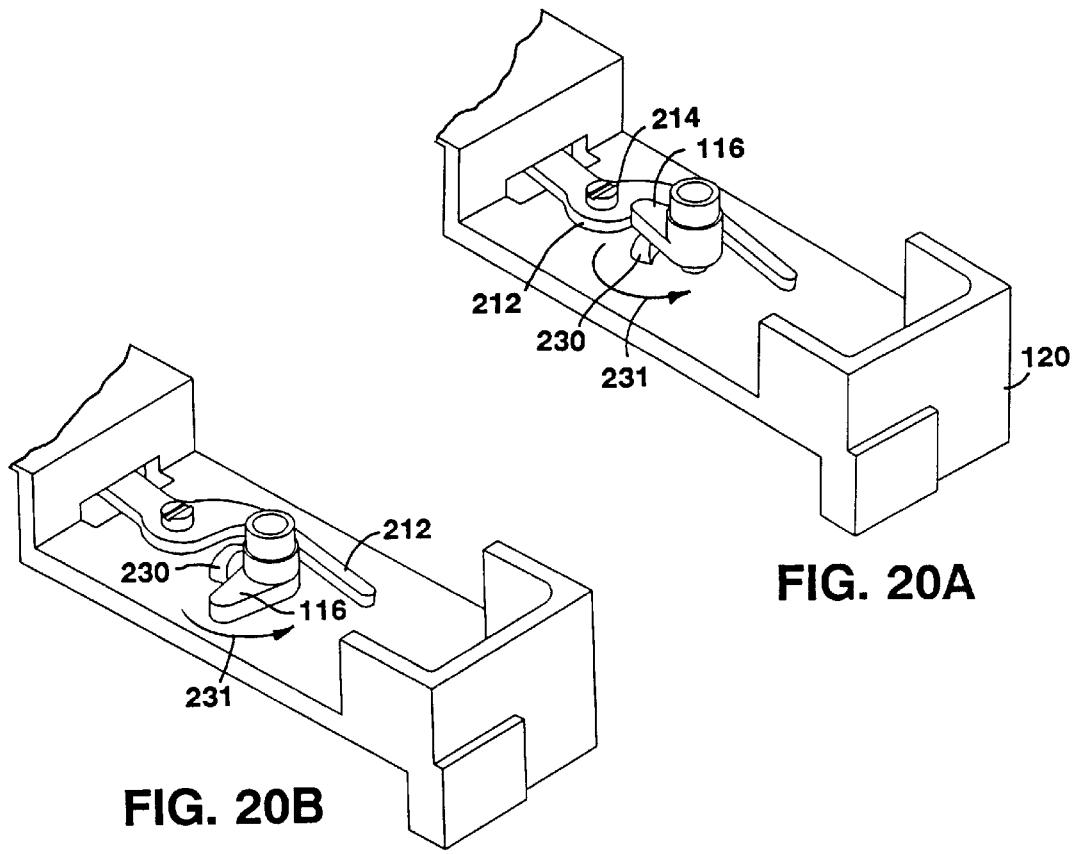
FIG. 20A
FIG. 20B
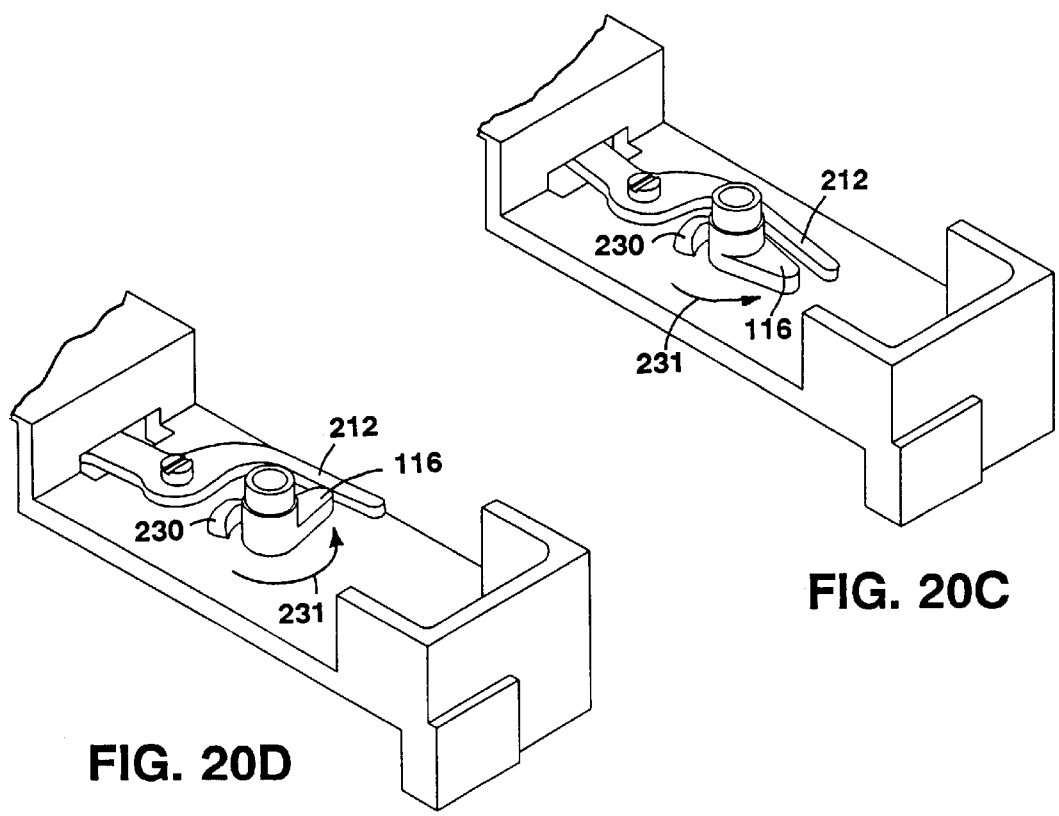
FIG. 20C
FIG. 20D

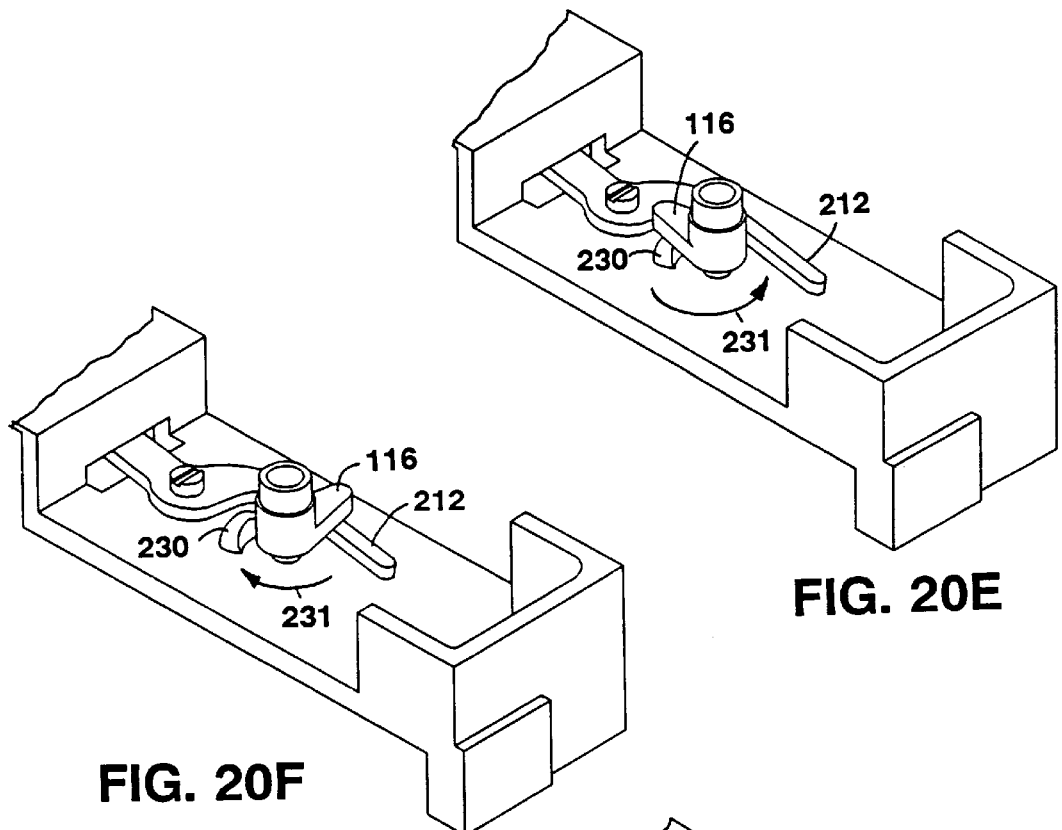
FIG. 20E
FIG. 20F
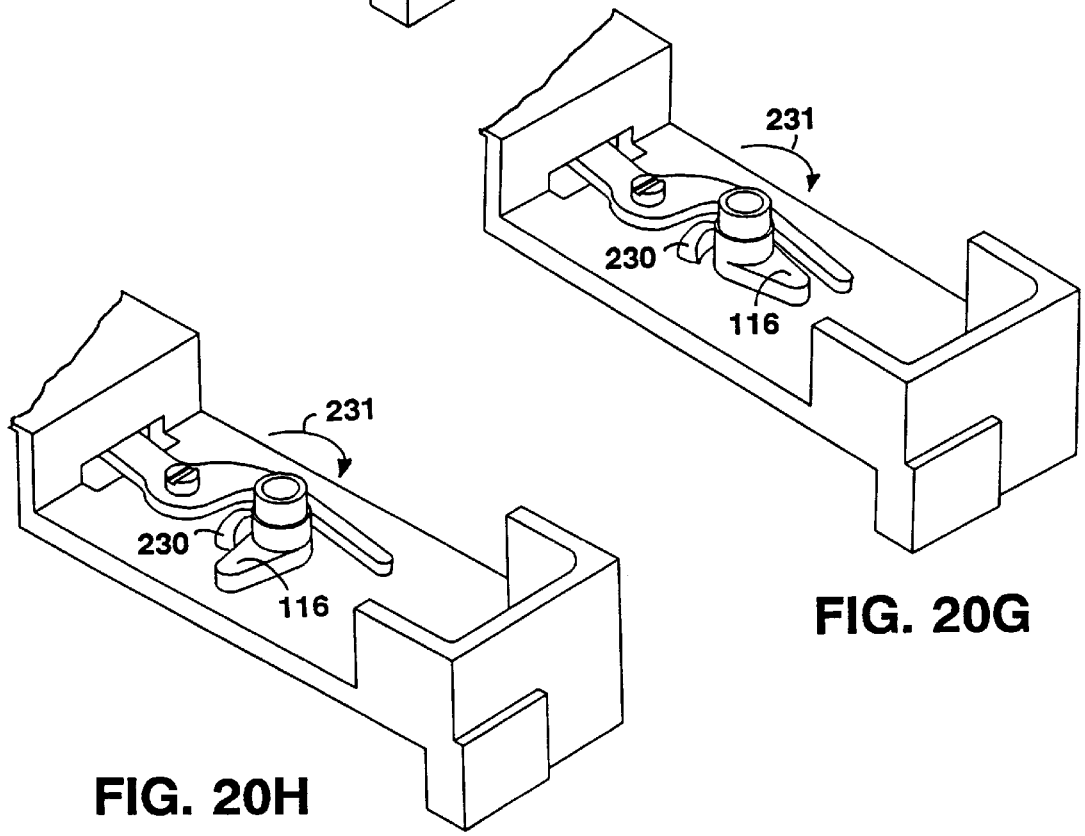
FIG. 20G
FIG. 20H

DATA STORAGE AND RETRIEVAL SYSTEM HAVING PLURAL DATA CARTRIDGES, PLURAL DRIVE MECHANISMS EACH WITH AN ASSOCIATED TRANSFER MECHANISM HAVING A FINGER MEMBER TO FULLY INSERT A CARTRIDGE INTO ITS ASSOCIATED DRIVE

This is a continuation of application Ser. No. 08/547,713, filed Oct. 26, 1995, now abandoned.

CROSS REFERENCE TO RELATED APPLICATIONS

This application is related to patent applications Ser. Nos. 08/885,510 filed Jun. 30, 1997 (a continuation of patent application Ser. No. 08/548,485 filed Oct. 26, 1995, now abandoned) and 08/865,554 filed May 29, 1997 (a continuation application of 08/548,413 filed Oct. 26, 1995, now abandoned.

BACKGROUND OF THE INVENTION

This invention relates generally to data storage/data retrieval systems and more particularly to systems of such type which are adapted to store a plurality of magnetic data cartridges in a single housing, or data library, and access a selected one, or ones, of the data cartridges to store data on such one, or ones of such data cartridges and/or retrieve data previously stored on such one, or ones of the data cartridges.

As is known in the art, large amounts of data may be stored on data cartridges, such as tape cassettes, compact disc (CD) read only memories (ROMs), digital linear tape cartridges, and helical tape cartridges. Such data storage systems may be used, for example, as a system for backing up data used in a local area network of personal computers. The amount of data to be stored may require more than one standard data cartridge. A housing, or library to house a plurality of data cartridges has been suggested. Many of these systems, or libraries, however, take up considerable space because the mechanism used to retrieve one of the cartridges uses a two-dimensional orthognal configuration, such as described in U.S. Pat. No. 4,812,629 (O'Neil et al.), a cylindrical grid configuration, such as described in U.S. Pat. No. 5,143,193 (Geraci), or a circular confirmation, such as described in U.S. Pat. No. 4,287,541 (Tanahashi et al.).

Other configurations are shown in: U.S. Pat. No. 4,063,294 (Burkhart); U.S. Pat. No. 3,774,916 (Namba); U.S. Pat. No. 3,807,741 (Uemura); U.S. Pat. No. 4,361,858 (Chambers); and, U.S. Pat. No. 4,510,539 (Young).

SUMMARY OF THE INVENTION

In accordance with the present invention, a system is provided for storing and retrieving data. The system includes: a conveyor system for carrying a plurality of data cartridges; and, a plurality of independently operable drive mechanisms, each one having a data cartridge transfer mechanism. The conveyor system is adapted to position a selected one of the data cartridges to the data cartridge transfer mechanism of a selected one of the drive mechanisms. When so positioned, the transfer mechanism removes the data cartridge and inserts it into the drive mechanism for processing (i.e., data may be written onto the data cartridge or data may be read from the data cartridge). The data cartridge may then be withdrawn from the drive mechanism after processing and returned to the conveyor system. Because each one of the drive mechanisms is operable independently of the other drives and each drive has its own data cartridge transfer mechanism, more than one data cartridge may be processed during the same time period, or during overlapping time periods.

In a preferred embodiment, the conveyor system includes a plurality of data cartridge carriers. Each one of the data cartridge carriers provides an open ended, vertically extending pocket for receiving a corresponding one of the data cartridges. Each of the carriers is mounted to a pair of parallel, vertically spaced, synchronously driven belts. The belts are stretched horizontally between a pair of laterally spaced pulleys. The pair of pulleys are mounted on two vertically extending shafts. One of the belts (i.e., the upper belt) is mounted an appropriate distance above the midpoint of the shafts and the other belt (i.e., the lower belt) is mounted an appropriate distance below the midpoint of the shaft. Each of the carriers is mounted vertically on the pair of belts. More particularly, each carrier has its rear, closed end attached to the belts and has its open end facing outwardly from the belts. The top end of the rear of the carrier is attached to the upper belt and the bottom end of the rear of the carrier is attached to the lower belt.

In accordance with another feature of the invention the conveyor system includes: an oblong shaped case having a plurality of openings disposed along an elongated side portion thereof; and, a conveyor, disposed within the case, for holding a plurality of data cartridge in a continuous closed loop arrangement, such loop being substantially linear along the elongated side of the case. The shafts are each rotatably mounted to a base, or floor, of the case. One of the shafts is driven by a motor and coupled drive mechanism. When one of the shafts is driven, the belts, and hence the carriers mounted thereto, rotate around the two shafts in a fashion which is substantially linear in the region between the two shafts. The motor and coupled drive mechanism is adapted to rotate the belts either clockwise, or counterclockwise. Located proximate to the region of linear carrier progression is the plurality of independently operable drive mechanisms. Each one of the drive mechanisms has a data cartridge transfer mechanism. The conveyor system is adapted to position one of the data cartridges at a selected one of the drive mechanisms. When so positioned, the transfer mechanism grasps opposing, upper and lower outer side portions of the data cartridge extending outwardly from the open end of its carrier, draws the grasped data cartridge from its carrier, and then draws the grasped data cartridge into the drive mechanism. Once inside the drive mechanism, the data cartridge may be processed, That is, data may be written onto the data cartridge or data may be read from the data cartridge. The data cartridge may then be withdrawn from the drive mechanism after processing and returned to the carrier using the reverse process. Because the carriers are arranged substantially in two parallel rows with the plurality of drive mechanisms located along one of the rows, the data cartridge carriers may be located close to the plurality of independent drive mechanisms for easy transfer of the cartridges. Further, with the arrangement, there is very little wasted space in the housing.

In accordance with another feature of the invention, the housing is generally rectangular in shape. The drive mechanisms are regularly arranged in a row along one of the elongated sides of the rectangular shaped housing. The conveyor system is in an oblong shaped case which is insertable into, and removable from, a portion of the housing positioned along side of the row of drive mechanisms. With such arrangement, the data cartridge assembly may be packaged in the case to provide a library of data stored on the data cartridges. The case has a plurality of openings along a side portion which face the row of drive mechanisms. More particularly, each one of the openings faces a corresponding one of the drive mechanisms. With such arrangement, the case, or data library, is removable from, and insertable into, the housing separate from the housing mounted drive mechanisms. Therefore, each of a plurality of cases may have different data files without the expense of also having a drive mechanism. The user may easily insert a relatively lightweight case, with the files of data desired, into the housing for processing by the drive mechanisms, and once processed, remove the case and insert a different case if different files are to be processed.

In accordance with still another feature of the invention, the drive mechanisms are insertable into the housing through a top, pivotally mounted lid. With such arrangement additional drive mechanisms may be easily added to the system.

In accordance with another feature of the invention, the case has an additional opening. The housing has a front mounted door, or user access port. The additional opening provided in the case is disposed behind the door. Thus, when the door is opened, the user may insert a data cartridge into a carrier, or, on the other hand, the user may remove a data cartridge from its carrier.

In accordance with another feature of the invention, the case is provided with a slidable shutter, or dust cover, positioned in front of the openings. The shutter is normally closed when the case is removed from the housing. When inserted into the housing, the shutter slides away from the openings to enable access by the adjacent, opposing drive mechanisms. With such an arrangement, when the case, with its stored data cartridge is removed from the housing the data cartridge is isolated from dust and dirt.

In accordance with still another feature of the invention, a data cartridge transfer mechanism is provided having a reversible motor mechanically coupled to a pair of vertically opposed belt supports and belts mounted to the belt supports. The belt supports are normally in a fully opened position (i.e., have a maximum vertical separation between them) to enable the portion of the vertically positioned data cartridge extending outwardly from its carrier to pass between such supports as the conveyor system rotates the carriers to a desired position. When a selected data cartridge is positioned in front of one of the drive mechanism selected to process such data cartridge, the data cartridge transfer mechanism motor rotates in a first direction and, in response to such motor rotation, the belt supports are driven by the motor vertically towards each other until the belts thereon grasp the exposed sides of the selected data cartridge. Concurrently therewith, the belts rotate in a horizontal direction while the data cartridge transfer mechanism motor continues to rotate in the first direction to draw the grasped data cartridge out of its carrier and into the selected drive mechanism. After processing by the drive mechanism, the direction of rotation of the data cartridge transfer mechanism motor reverses, the data cartridge is withdrawn from the drive and inserted into its carrier by the belts rotating in a reverse direction. Finally, while the motor continues to rotate in the reverse direction, the belt holders move vertically apart and return to their normal, fully opened position.

BRIEF DESCRIPTION OF THE DRAWING

FIG. 1A is an exploded isometric view of the data storage and retrieval system of FIG. 1, such view showing the conveyor system of the data cartridge transport system being introduced through an opened door of the housing.

FIG. 4 is a more detailed, exploded isometric view of the data cartridge transport system of a FIG. 3;

FIG. 4C is an exploded view of the data cartridge carrier of FIG. 4A and portions of belts used attachable to the data cartridge carrier;

FIG. 4E is a cross-sectional, side elevation diagram of a case for the transport system of FIG. 2, such diagram being useful in understanding the operation of a dust cover used in such case;

FIG. 4F is an enlarged view of a portion of one of the belts of FIG. 4C, such portion being shown inserted into a data cartridge of FIG. 4A;

FIGS. 7 is a side elevation view, somewhat simplified, of a portion of the data cartridge conveyor system and a data cartridge carrier of the conveyor system with its housed data cartridge positioned facing a drive mechanism and its associated data cartridge transfer mechanism;

FIG. 8 is an exploded isometric view of a module made up a tape mechanism, its associated data cartridge transfer mechanism and its associated electronic printed circuit board;

FIGS. 8C through 8E are top, side and front elevation views, respectively, of a mechanical finger used in the data cartridge transfer mechanism of FIG. 8 in the final phase of data cartridge insertion into the drive mechanism;

FIG. 8F is a drawing showing the mechanical finger of FIGS. 8C through 8E attached to a shaft for rotation on such shaft;

FIGS. 8G and 8H are different views of a spring used with the mechanical finger of FIGS. 8C and 8E;

Figure 4A:
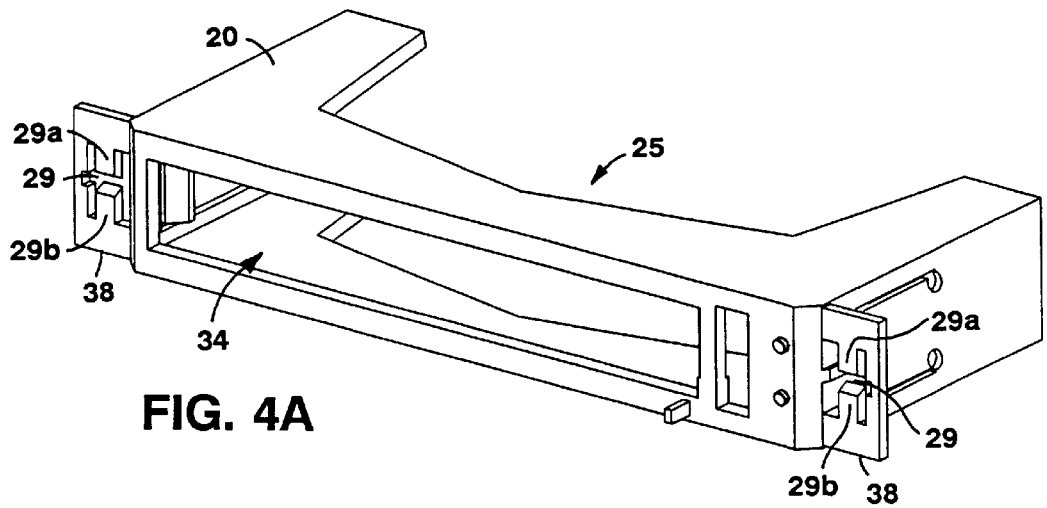
FIG. 4A is an isometric view of a data cartridge carrier used in the conveyor system of FIG. 4.
Figure 10B:
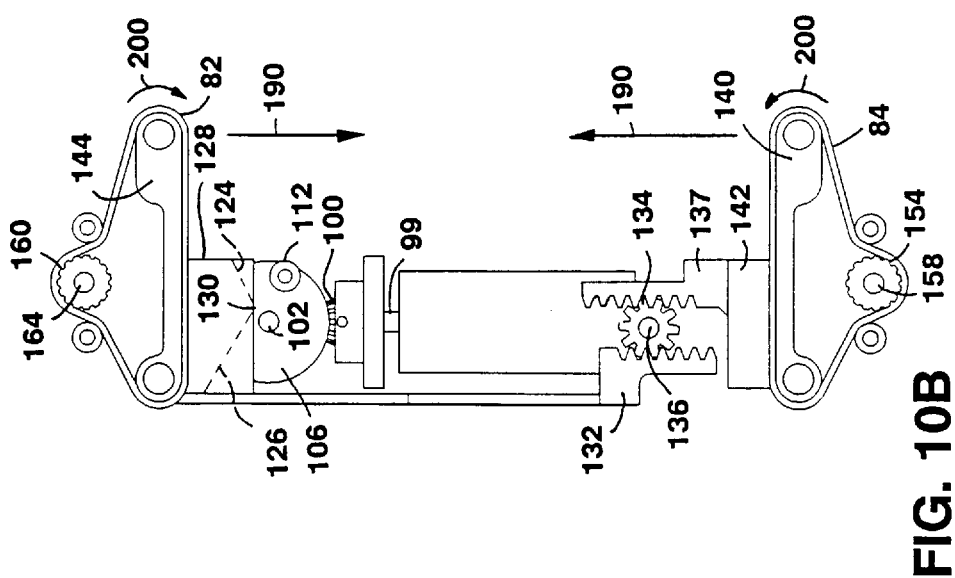
FIGS. 10A and 10B are diagrammatical sketches of a side view of the portion of the data cartridge transfer mechanism of FIG. 8, such sketch being useful in understanding vertical motion of a pair of belt supports of the data cartridge transfer mechanism, the sketch in FIG. 10A showing the belt supports of the data cartridge transfer mechanism of FIG. 9 in their normal, maximum vertically separated position and the sketch in FIG. 10B showing the belt supports of the data cartridge transfer mechanism of FIG. 9 in their minimum vertically separated position.
Figure 10A:
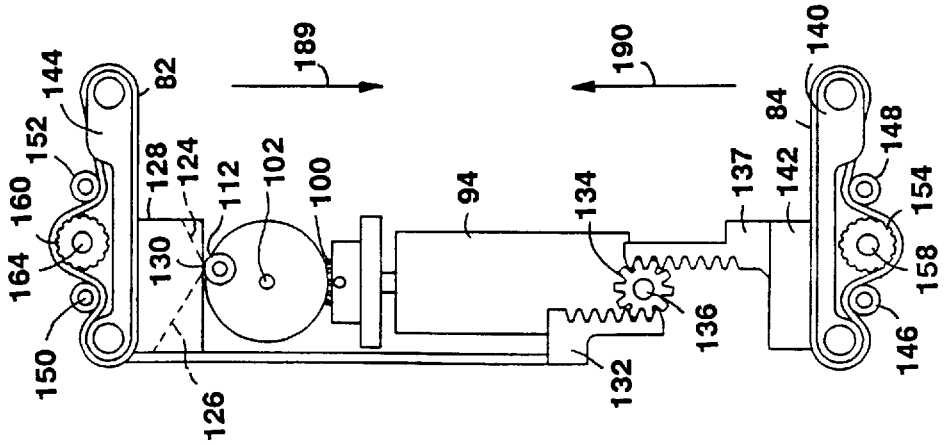
Figure 10D:
Figure 12:
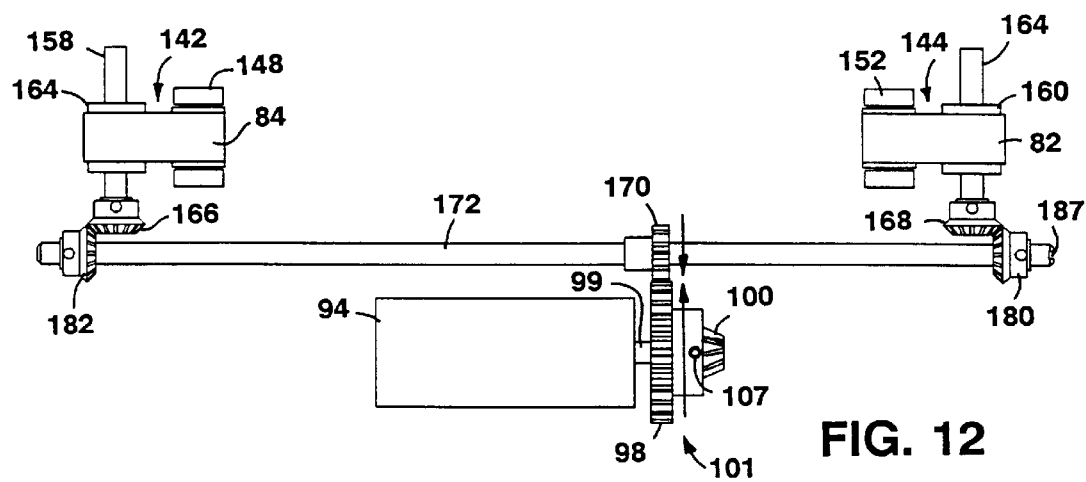
Figure 21:
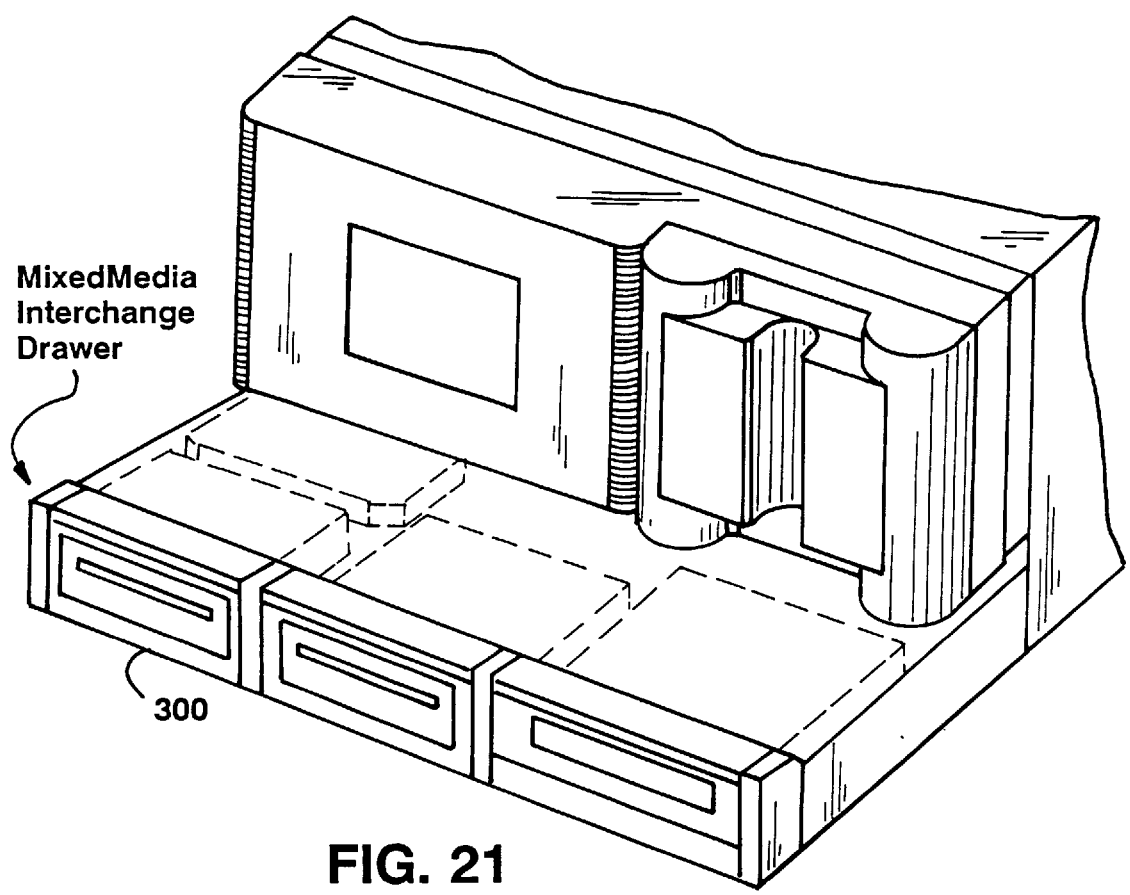

FIG, 10C is partially cross-sectional view of a clutch mechanism used in the transfer mechanism of FIGS. 10A and 10B;

FIG. 10D is an enlarged portion of a belt used in the transfer mechanism of FIGS. 10A and 10B;

FIGS. 11A through 11H are drawings useful in understanding the operational sequence of the data cartridge transfer mechanism of FIG. 8 in removing a data cartridge from the carrier of FIG. 4C and transferring it to a drive mechanism;

FIG. 12 is a diagrammatical sketch of a side view of a portion of the data cartridge transfer mechanism of FIG. 8, such sketch being useful in understanding rotary motion of belts mounted to a pair of belt supports of the data cartridge transfer mechanism;

FIGS. 12A, 12B, 12C through 19A, 19B, 19C are drawings useful in understanding the operational sequence of the mechanical finger of FIGS. 8C, 8D and 8F, such finger being used to provide the final insertion force to a back surface of the data cartridge in injecting it into the drive mechanism;

FIGS. 20A through 20H are drawings useful together with FIGS. 12A, 12B, 12C through 19A, 19B, 19C in understanding the operational sequence of the mechanical finger of FIGS. 8C, 8D and 8F inserting a data cartridge into the drive mechanism both during the process of inserting such data cartridge and in removing such data cartridge; and FIG. 21 is an isometric drawing of the data storage and retrieval system with a draw thereof opened to show a variety of storage devices adapted for use with such system.

DESCRIPTION OF THE PREFERRED EMBODIMENTS

Figure 1:
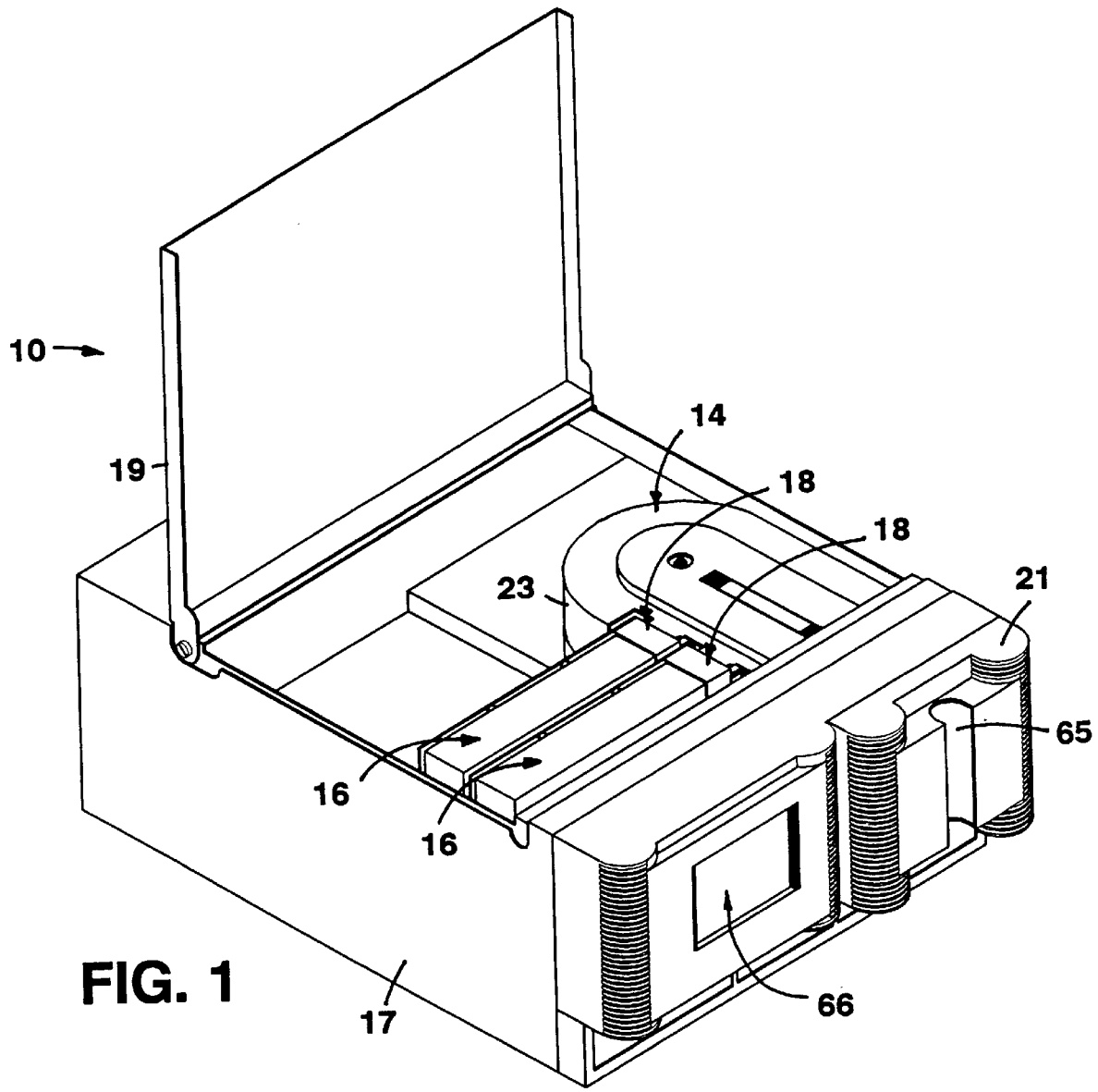
FIG. 1 is an isometric view of a data storage and retrieval system according to the invention, such drawing showing a lid of a housing for such system lifted into an opened position.
Figure 2:
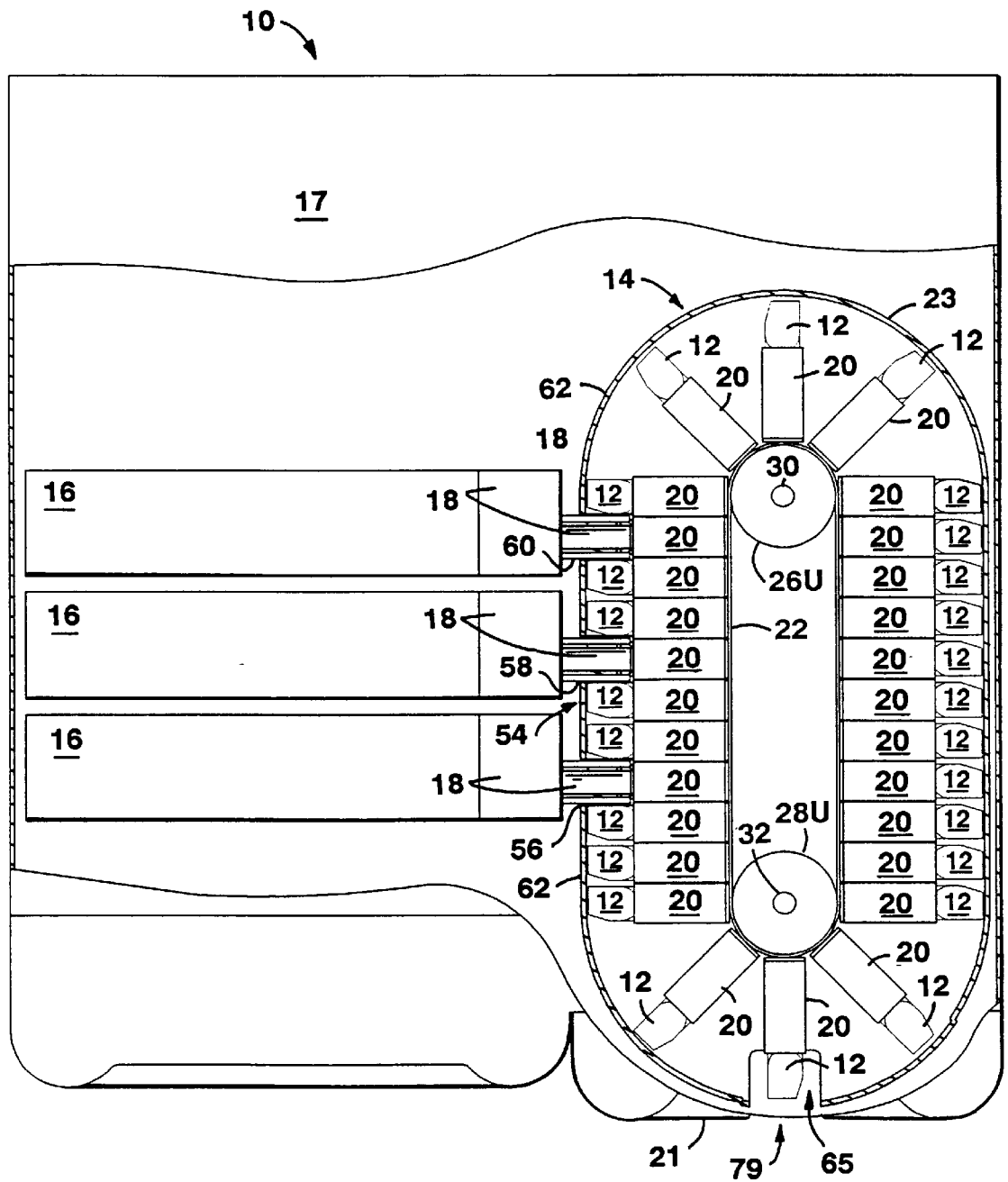
FIG. 2 is a top view of the system of FIG. 1 with a portion of the housing partially broken away.

Referring now to FIGS. 1, 1A, and 2, a data storage and retrieval system 10 is shown having: a plurality of, here twenty-eight, data cartridges 12, here eight millimeter (mm) cassette tapes, disposed in a data cartridge conveyor system 14; and, a plurality of, here three, independently operable drive mechanisms 16, here eight mm tape drives. The system 10 includes a rectangular housing, or cabinet 17. A lid 19 is pivotally mounted to the back portion of the housing 17, as shown in FIG. 1, and when opened allows the drive mechanisms 16 to be mounted in the cabinet 17. This arrangement enables the easy addition or removal of drive mechanisms 16. The data cartridge conveyor system 14 is insertable into, and removable from, the cabinet 17 through a front door 21, as shown in FIG. 1A. Each one of the drive mechanisms 16 has a data cartridge transfer mechanism 18, here a cassette tape transfer mechanism, to be described in detail in connection with FIGS. 7, 7A through 7D, 8, 9, 10A, 10B, 11A through 11H, 12, 12A through 19C and 20A through 20H. Suffice it to say here, however, that the conveyor system 14 is adapted to position a selected one of the data cartridges 12 to the transfer mechanism 18 of a selected one of the drive mechanisms 16. When so positioned, the transfer mechanism 18 removes the data cartridge 12 from the conveyor system 14 and inserts it into the selected drive mechanism 16 for processing (i.e., data may be written onto the tape or data may be read from the tape). The transfer mechanism 18 then withdraws the data cartridge 12 from the selected drive mechanism 16 after processing and returns it to the conveyor system 14. Because each one of the drive mechanisms 16 is operable independently of the other drive mechanisms 16 (i.e., each drive mechanism 16 has its own tape transfer mechanism 18), more than one data cartridge 12 may be processed during the same time period, or during overlapping time periods.

Figure 3:
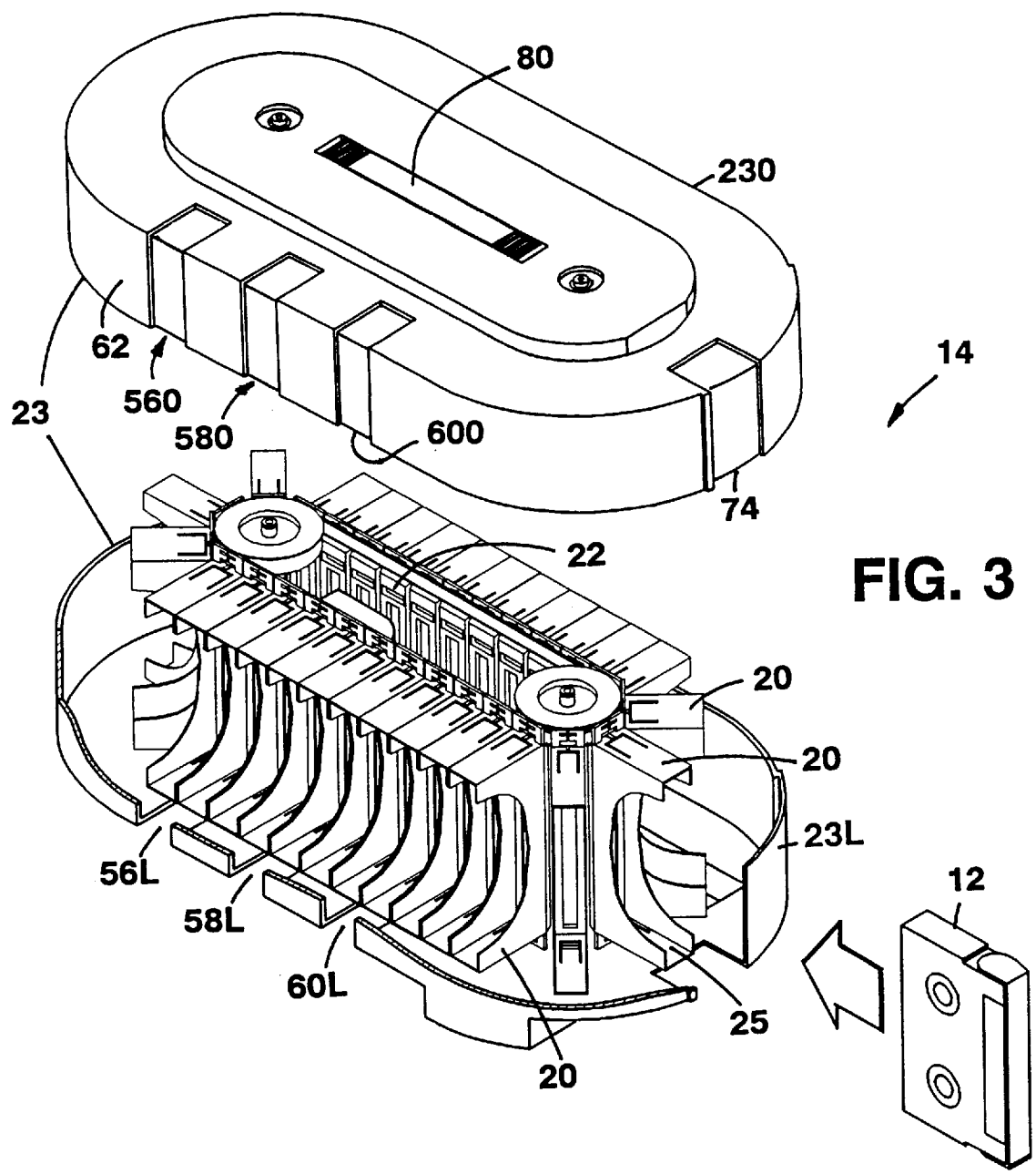
FIG. 3 is an exploded isometric view of a data cartridge transport system of the data storage and retrieval system of FIG. 1, such view showing a data cartridge insertable into a data cartridge carrier of the conveyor system.

More particularly, referring also to FIGS. 3 and 4, the conveyor system 14 includes a two piece case 23; i.e. the case 23 has an upper portion 23U and a lower portion 23L. The case 23 is oblong shaped and stores a conveyor for holding the plurality of data cartridge 12 in a continuous closed loop arrangement. The loop is substantially linear along the elongated side of the case 23. More particularly, the case 23 houses the plurality of data cartridge carriers 20, here tape cassette carriers, shown more clearly in FIGS. 4A, 4B, 4B' and 4C). Each one of the data cartridge carriers 20 provides an open ended, vertically extending pocket for receiving a corresponding one of the data cartridges 12. More particularly, a data cartridge 12 is slipped horizontally into the open end 25 of the carrier 20, as shown in FIG. 3. Each of the carriers 20 is mounted to a pair of parallel, vertically spaced, synchronously driven timing belts 22, 24, as shown more clearly in FIGS. 4, 4C, 4D and 4F. The belts 22, 24 are stretched horizontally between a pair of laterally spaced upper pulleys 26U, 28U and a pair of laterally spaced lower pulleys 26L, 28L, respectively, as shown. Here the belts 22, 24 have a 0.200 inch drive pitch, a 97 tooth pitch length, a 19.6 inch circumference, 28 outside paddles, a urethane body with a Nylon material core and a minimum 1060 pound per inch breaking strength in endless form. The belts 22, 24 are formed with tabs 27. The tabs 27 are inserted into a pair of slots 29 formed at opposite ends of a rearward positioned mounting flanges 36, 38, as shown in FIGS. 4C and 4F. More particularly, the slot 29 of each flange 36, 38 is formed between a pair of opposing cantilevered fingers 29a, 29b (FIGS. 4A, 4C, 4F). As shown in FIG. 4F, as tab 27 on belts 22, 24 is inserted into one of the slots 29 of carrier 20, the tab 27 deflects the fingers 29a, 29b outwardly, as shown in FIG. 4F. The resiliency of the cantilevered fingers 29a, 29b secure the tab 27 to the flanges 36, 38 of the carrier 20. That is, after insertion through the slots 29, the fingers 29a, 29b tend to return to their original non-deflected form and thereby provide sufficient force to retain the carrier 20 to the belts 22, 24. Thus, each carrier 20 has its rear end 34 attached to the belts 22, 24 and has its open end 25 facing outwardly from the circumference of the belts 22, 24.

Figure 4B:
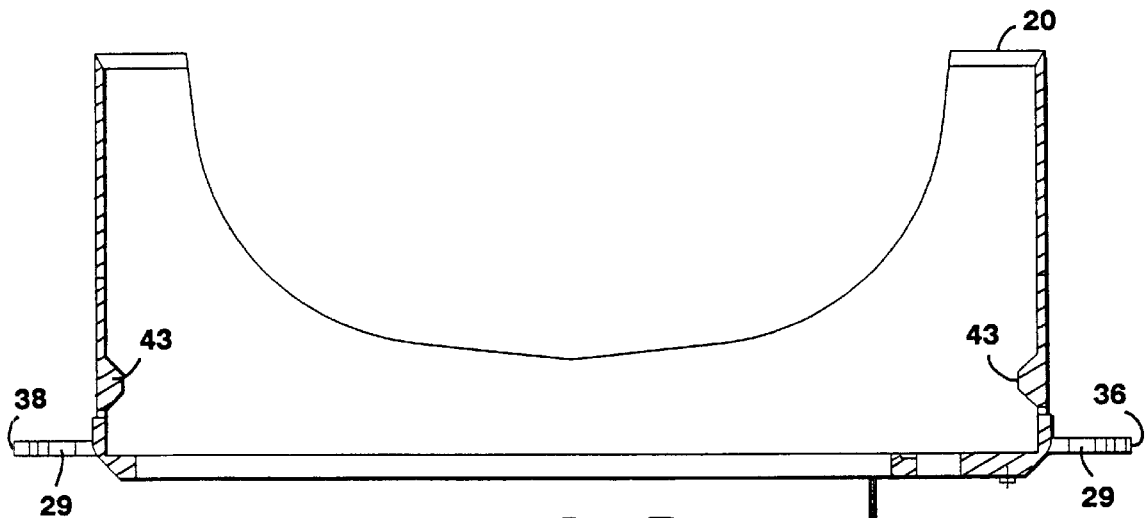
FIGS. 4B and 4B' are a side elevation views, of the data cartridge carrier of FIG. 4A, FIG. 4B being a cross sectional view of the carrier and FIG. 4B' being a cross sectional view of the carrier with a data cartridge inserted therein, the data cartridge being a simplified sketch, partially broken.
Figure 4B:
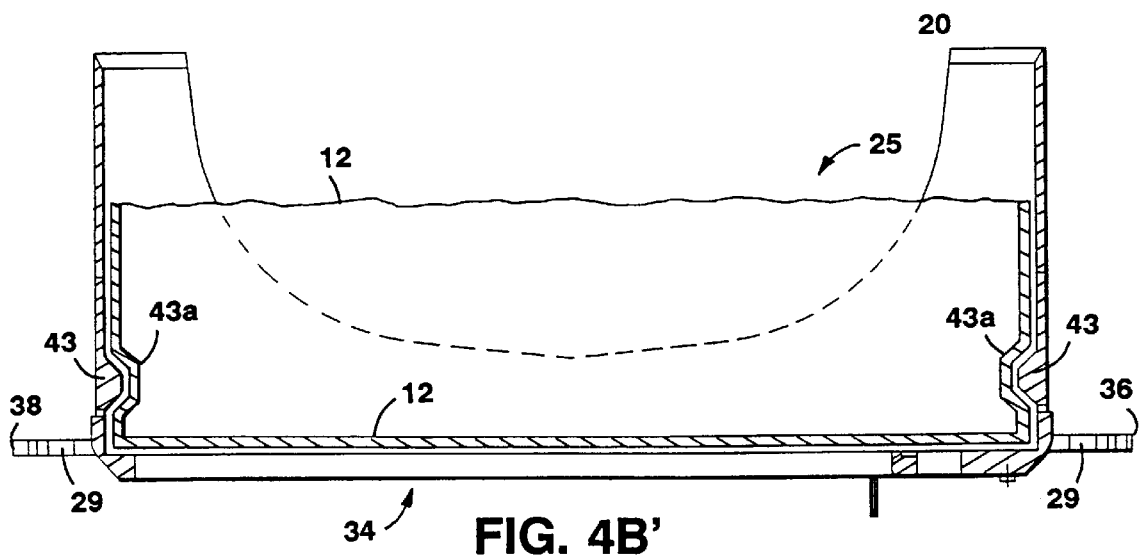

Each one of the carriers 20 has flaps 40, 42 formed therein, as shown in FIG. 4C. Each flap 40, 42 is attached to the sides of the carrier 20 at only end. A button like element 43 is formed on the inner surface of each flap 40, 42 as shown in FIG. 4B. When a data cartridge 12 is inserted into the carrier 20 as shown in FIG. 4B', indentations 43$a$ (FIG. 4B), in the sides of the data cartridge 12 engage the buttons 43. The buttons 43 engage the indentations 43$a$ on the data cartridge 12, with the resiliency of the flaps 40, 42 providing an inward force to retain the inserted data cartridge 12 within the carrier 20.

Figure 4D:
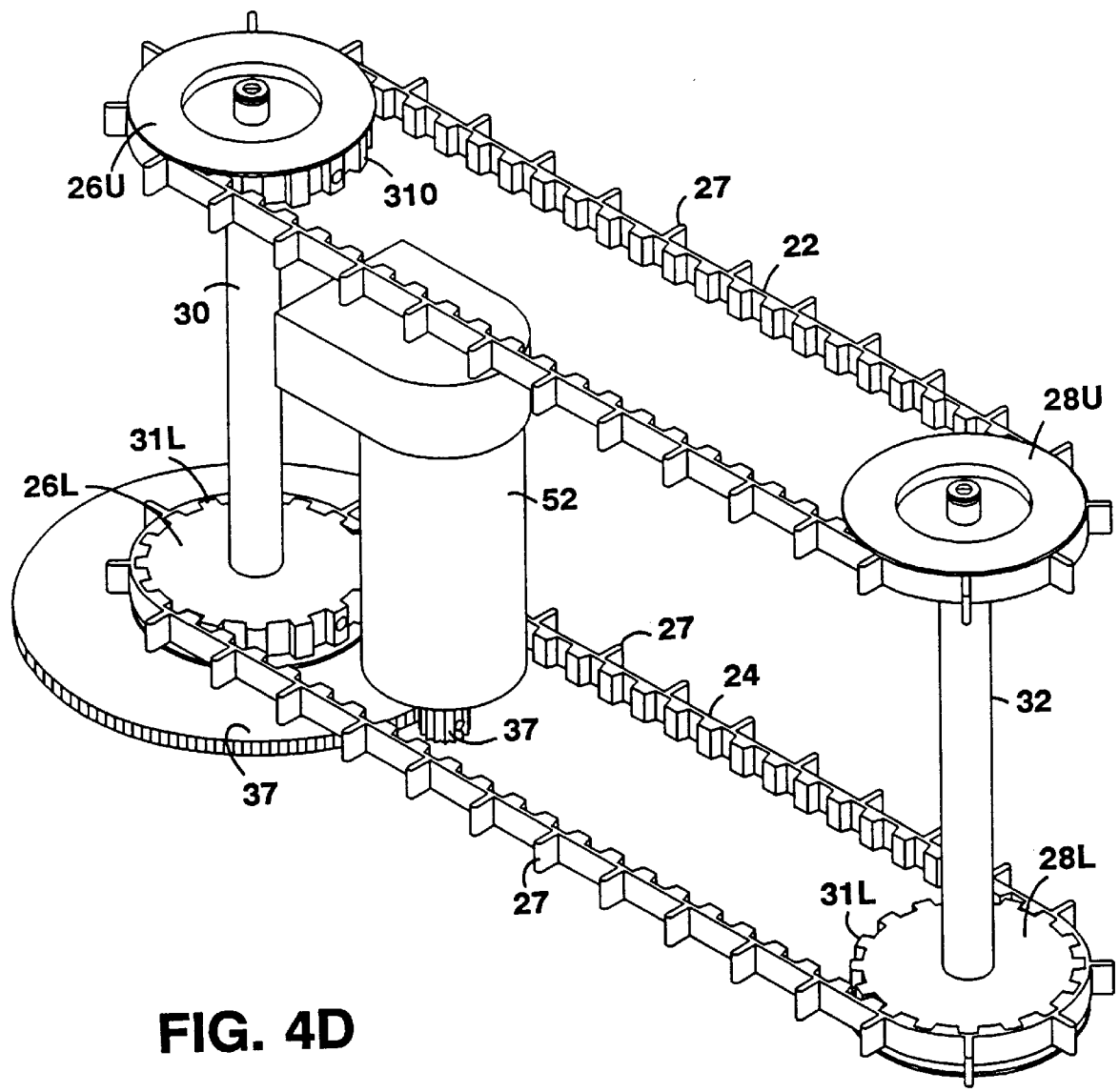
FIG. 4D is an isometric view of a pair of pulleys, belts and drive mechanism therefore used in the transport system of FIG. 4.

As shown more clearly in FIG. 4D, the pairs of pulleys 26U, 26L and 28U, 28L are mounted on two vertically extending shafts 30, 32, respectively. One of the belts (i.e., the upper belt 22) is stretched between upper pulleys 26U, 28U and the other belt (i.e., the lower belt 24) is stretched between lower pulleys 26L, 28L, as shown in FIGS. 4 and 4D. The upper pair of pulleys 26U, 28U are mounted an appropriate distance above the midpoint of the shafts 30, 32 and the lower pulleys 26L, 26U are mounted an appropriate distance below the midpoint of the shafts 30, 32 with the teeth 31U, 31L thereof in registration. That is, the teeth 31U of upper pulleys 26U and 28U are in registration with the teeth 31L of lower pulleys 26L and 28L.

As described above, and as shown in FIGS. 4 and 4C, each of the carriers 20 is mounted vertically on the pair of belts 22, 24. The top flange 38 of carrier 20 is attached to the upper belt 22 and the bottom flange 44 of the carrier 20 is attached to the lower belt 24. The shafts 30, 32 are each rotatably mounted to the base 46 of the lower portion 23L of the case 23 (FIG. 4). One of the shafts 30, 32, here the forward shaft 30, has a gear 37, shown more clearly in FIG. 4D, affixed to the lower end thereof. The gear 37 is engaged by a gear 39 mounted to the shaft of a motor 52. The motor 52 is mounted to the base 46. When the motor 52 drives gear 37, shaft 30 rotates and drives the belts 22, 24, and hence the carriers 20 mounted thereto. The rotation around the two shafts 30, 32 is in a fashion which is substantially linear in the region 54 between the two shafts 30, 32. The motor 52 is adapted to rotate the belts 22, 24 either clockwise, or counterclockwise. The upper portion 23U of case 23 is fastened to the lower portion 23L by screws 33 (FIG. 4).

Figure 5A:
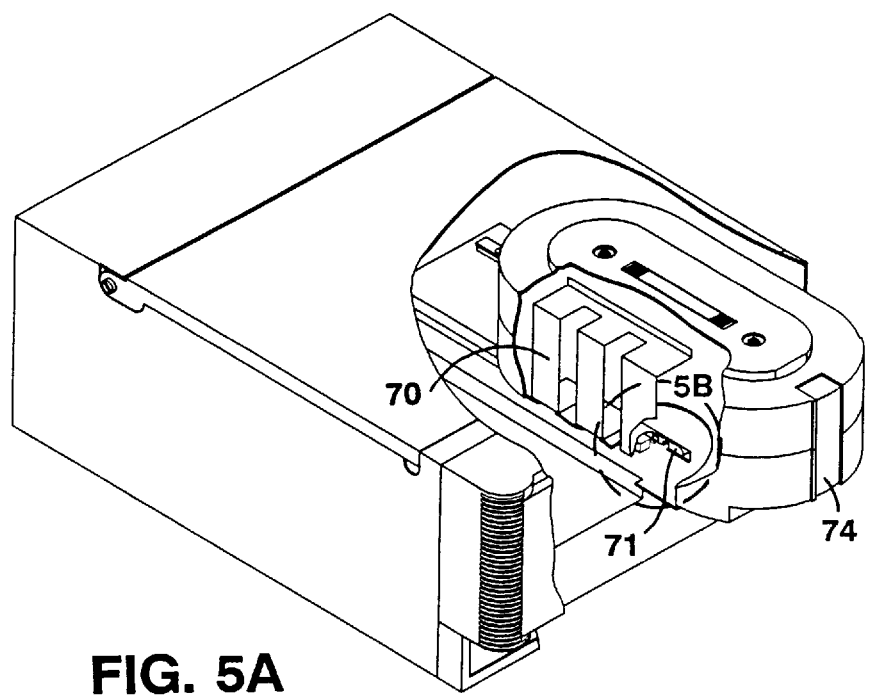
FIGS. 5A through 5D are partially broken away drawings of the case of FIG. 3, such drawings being useful in understanding the operation of the dust cover used therein.
Figure 5B:
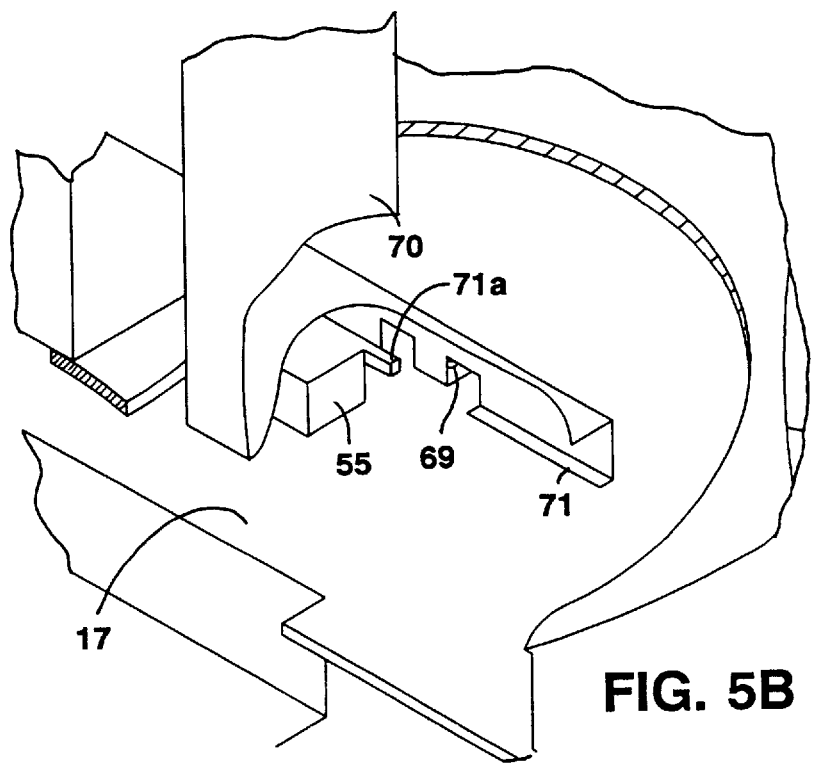
Figure 5C:
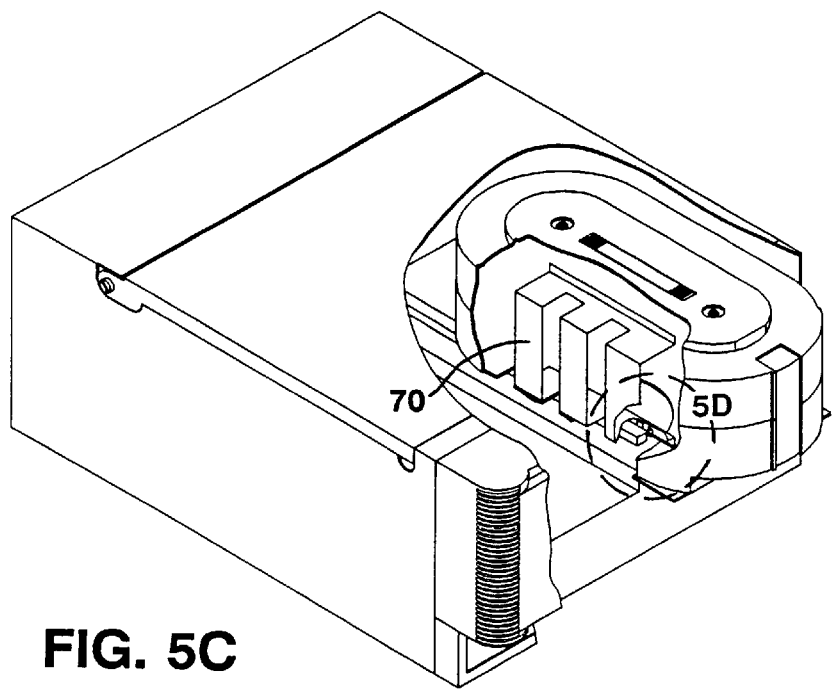
Figure 5D:
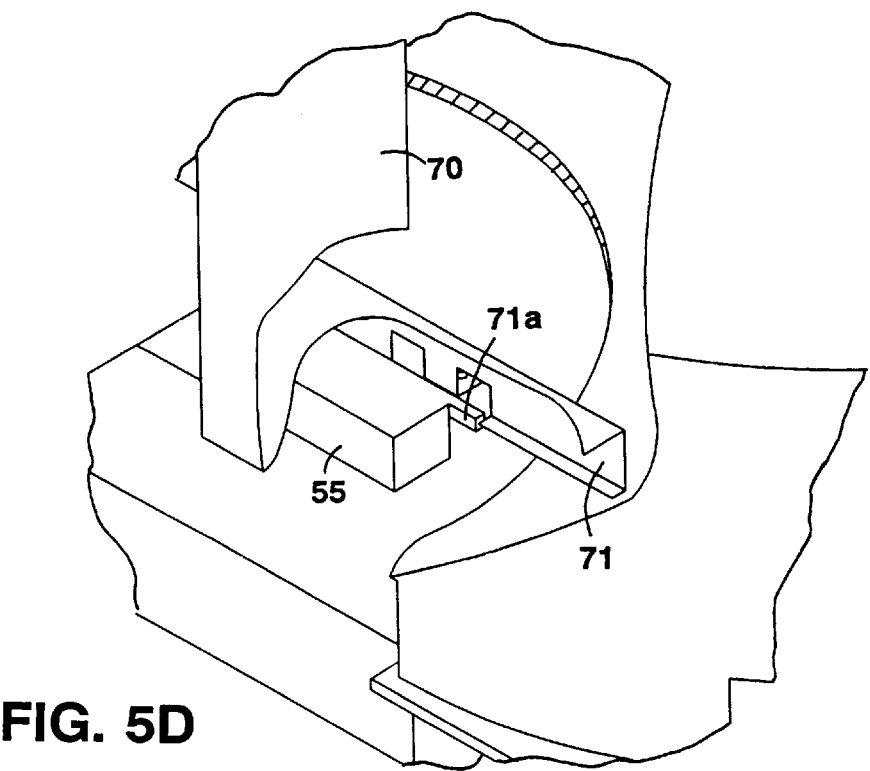
Figure 5E:
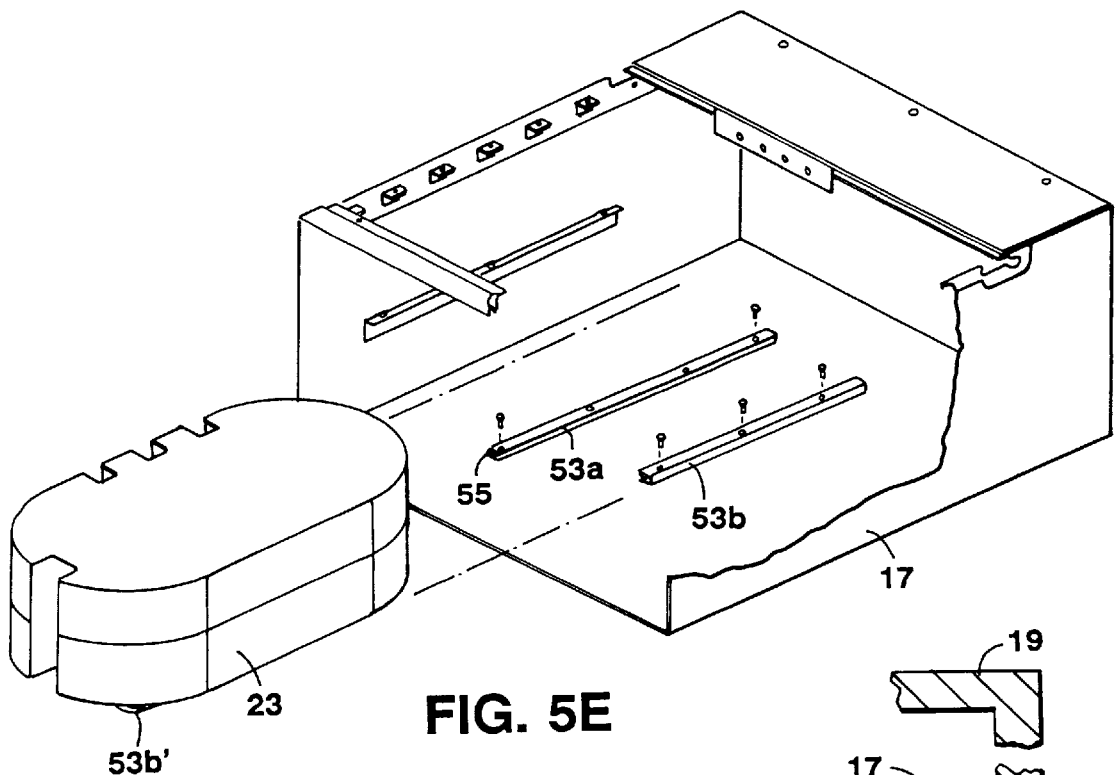
FIGS. 5E and 5E' are sketches useful in understanding the insertion and removal of the case from the housing, FIG. 5E being an exploded view of a broken away portion of the housing with a case being inserted and/or withdrawn therefrom with such sketch showing guide rails on the bottom of the housing, and FIG. 5E' being a cross sectional broken away sketch showing the case engaged with the guide rails shown in FIG. 5E, FIGS. 6A–6F are drawings useful in understanding the operation of an additional dust cover used in the case of FIG. 3.
Figure 5F:
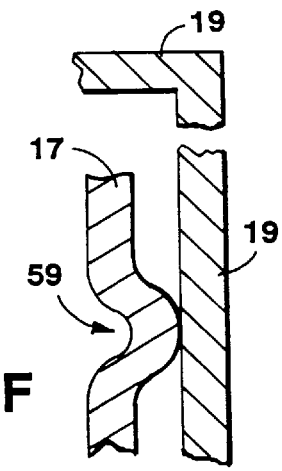
FIG. 5 is an exploded isometric view of the housing for the data storage and retrieval system of FIG. 1, the conveyor system of FIGS. 3 and 4, a drive mechanism and its associated data cartridge transfer mechanism.
Figure 5E:
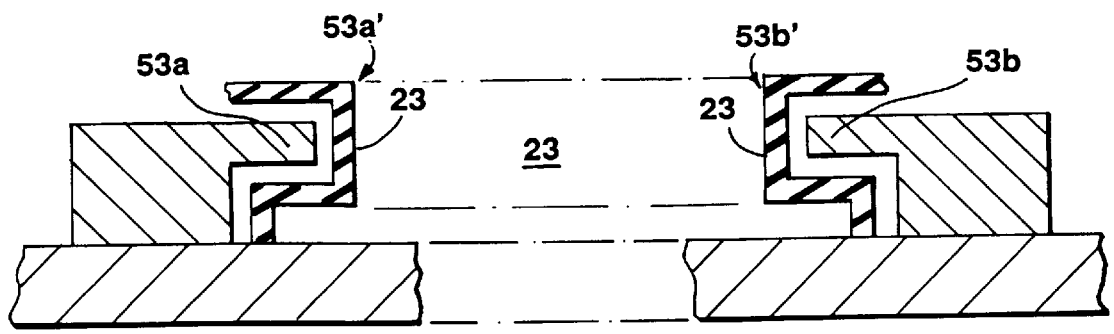
Figure 6E:
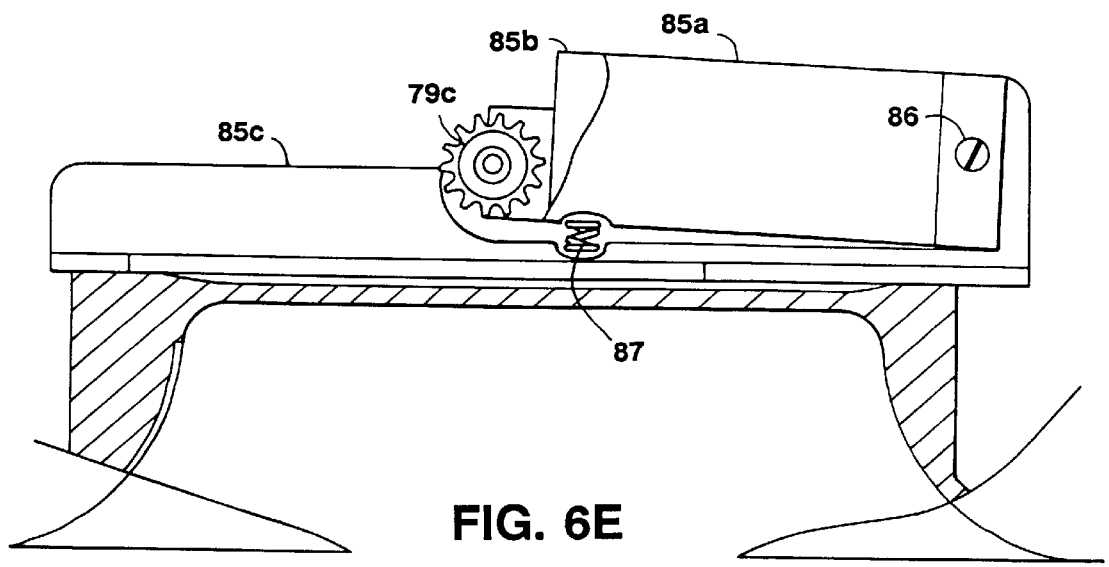

The case 23 (FIG. 4) provides a library of the data stored on the data cartridges 12. The case 23 has a plurality of, here three openings 56, 58, 60. More particularly, openings 56, 58, 60 are made of pairs of openings: 56U, 56L; 58U, 58L; and 60U, 60L formed in the upper and lower portions 23U, 23L, respectively, as shown, along a side portion 62 which faces the row of drive mechanisms 16, as shown in FIG. 2. More particularly, each one of the openings 56, 58, 60 faces a corresponding one of the drive mechanisms 16. The cabinet 17 is long enough to handle cases 23 of different lengths. Thus, if the user wishes to expand the data library, a longer case 23 having more than three openings may be inserted into the cabinet 17 through front door 21. Additional drive mechanisms 16 with their associated transfer mechanisms 18 would be mounted in the cabinet 17 through open lid 19. Thus, each additional opening in case 23 would use an additional drive mechanism 16 and associated transfer mechanism 18. The case 23 has an front opening 64 (FIG. 2) made of a pair of opening sections 64U, 64L formed in the upper and lower portions 23U, 23L of the case 23 (FIG. 4). The case 23 is provided with a laterally slidable shutter, or dust cover 70 positioned in front of the openings 56, 58, 60, as shown in FIGS. 1A and 4. The shutter 70 is normally urged into a closed position by spring 72 (FIGS. 4, 4E) to cover openings 56, 58, 60 when the case 23 is removed from the cabinet 17, as shown in FIG. 1A. More particularly, one end of spring 72 is attached to a post 69 (FIGS. 4, 5A, 5B) of the lower portion 23L (FIG. 3) of case 23 and the other end of spring 72 is attached to the shutter 70 at 69'. When the door 21 is opened, as shown in FIG. 1A, the case 23 may be inserted into, or removed from, the cabinet 17, as shown in FIG. 1A. More particularly, a pair of guide rails 53$a$, 53$b$ are formed on the outer bottom surface of the lower portion 23L of case 23 (FIGS. 5E, 5E'). The bottom of cabinet 17 has a pair of slotted members 53$a'$, 53$b'$ for receiving the guide rails 53$a$, 53$b$, respectively, to thereby guide case 23 into, and from, cabinet 17. More particularly, when inserted into the cabinet 17, a shoulder 71 of shutter 70 engages a projection 71$a$ of lip 55 (FIGS. 5, 5C, 5D) provided in the bottom of cabinet 17, to laterally slide shutter 70 forward and away from the openings 56, 58, 60 and thereby enable access through the openings 56, 58 60 by the adjacent, opposing three drive mechanisms 16, as shown in FIG. 2. An additional, slidable dust cover 74 is provided in front of the additional opening 64, as shown in FIGS. 1A, 4, 6A–6D). The additional dust cover 74 is adapted to be driven by motor 73 (FIG. 6D) mounted to door 21 into an open position, or a closed position as it slides rotatably along a pair of arcuate rails 76, 78, mounted to the upper and lower portions 23U, 23L of case 23, as shown in FIG. 4. The motor 73 is activated in response to user commands to a touch control panel 66 (FIG. 1). More particularly, slidable dust cover 74 is urged into a closed position by spring 77 (FIG. 6A). One end 72$a$ of spring 77 is connected to the housing 23 and the other end is connected to the slidable dust cover 74, as shown in FIG. 6A. When activated motor 73 turns gear 79$a$, which thereby turns gear train 79$b$. Gear 79$c$ engages a gear member 79$d$ of the slidable dust cover 74, as shown in FIGS. 6A, 6B and 6C.

Figure 6D:
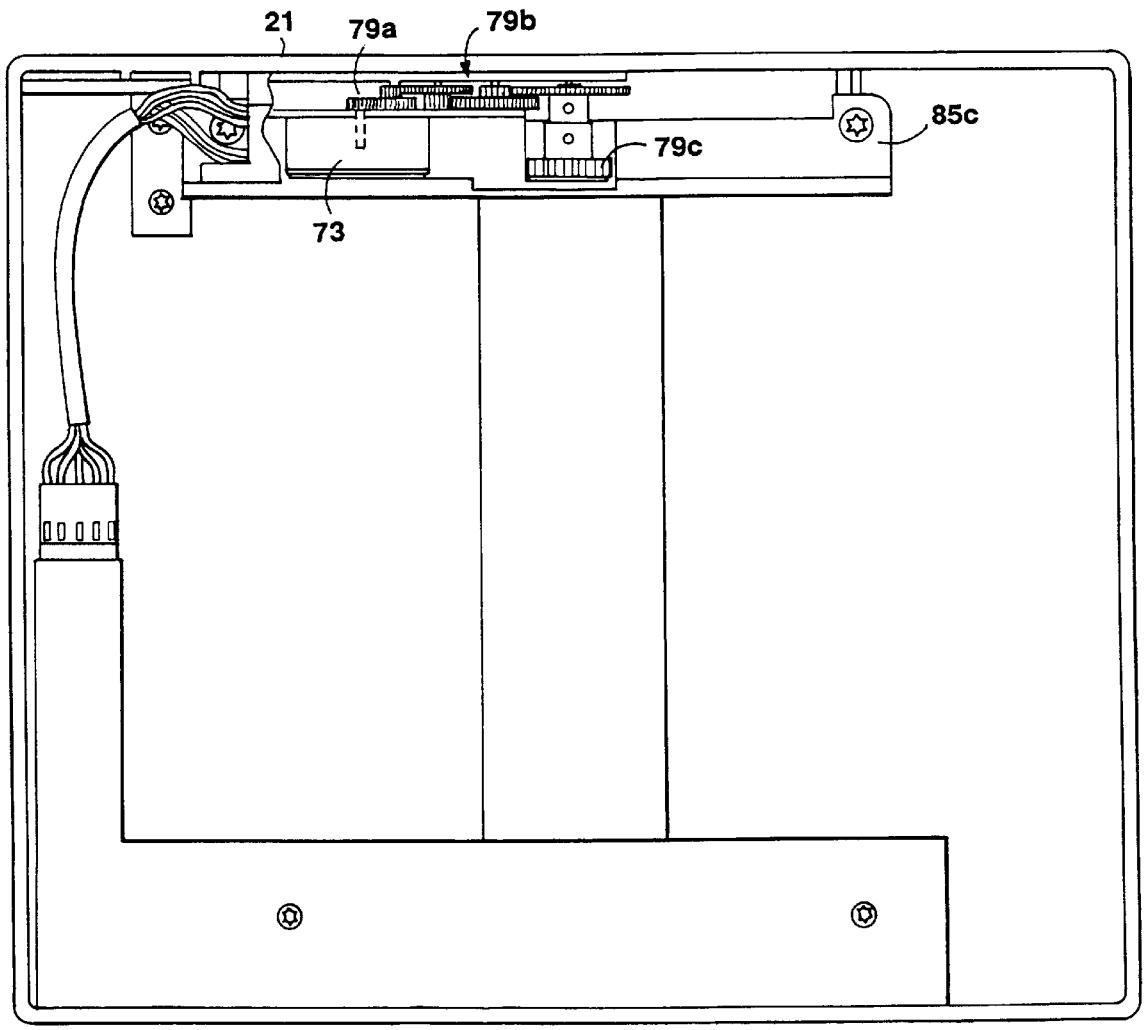
Figure 6F:
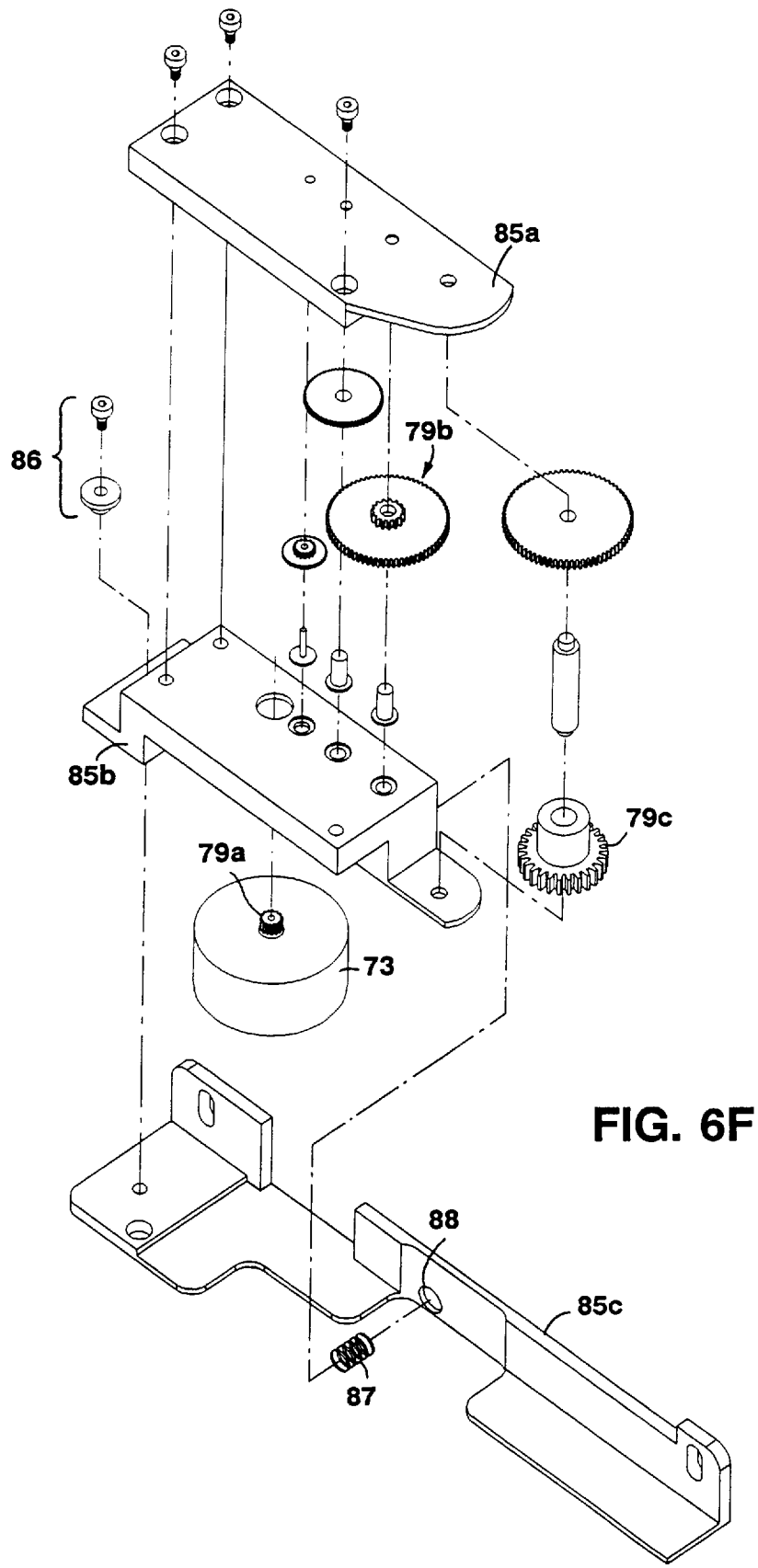

More particularly, motor 73, gear train 79$b$, and gear 79$c$ are mounted between a pair of mounting plates 85$a$, 85$b$ FIG. 6F. The pair of mounting plates 85$a$, 85$b$ are pivotally mounted to a lower plate 85$c$ by means of pivoting screw assembly 86. A spring 87 is mounted between a pocket 88 formed in lower plate 85$c$ and the rear of mounting plate 85$b$. The screw urges the mounting plates 85$a$, 85$b$ and therefore gear 79$c$ inwardly toward gear 79$d$, as shown in FIGS. 6C and 6D. Thus, the gear 79$c$ will meet up with the gear 79$d$ when the door is closed. With spring 87 pushing gears 79$c$ and 79$d$ together, the gears will always maintain good contact with each other. Also, if the teeth of gears 79$c$, 79$d$ do not line up exactly when the door is closed, as soon as motor 73 turns gear 79$c$, the teeth of gears 79$c$, 79$d$ will snap together in proper alignment.

As noted above, the cabinet 17 (FIG. 1A), when the door 21 is opened, as shown in FIG. 1A, the case 23 may be inserted into, or removed from, the cabinet 17, as shown in FIG. 1A. When the case 23 is inserted into the housing 17 (FIGS. 1A and 2), the independently operable drive mechanisms 16 and the associated transfer mechanism 18 are located proximate to the linear carrier 20 progression region 54. Further, the door 21 has a slot 65 passing through it. When the user wishes to insert, or remove an individual data cartridge, door 21 need not be opened. Rather, a touch is made to a touch control panel 66 (FIG. 1) on the face of the cabinet 17 to command motor 73 (FIG. 6D) to slide the additional dust cover 74 away from the front opening 64 so that the user may insert a data cartridge 12 into a carrier 20 through the slot 65, as shown in FIG. 3, or, on the other hand, the user may remove a data cartridge 12 from its carrier 20 through slot 65. Thus, insertion, or removal of a data cartridge 12 does not require opening of the front door 21.

Finally, the upper portion 23U of the case 23 is provided with a retractable handle 80, as shown in FIGS. 1A and 4. The handle 80 is urged in a normally retracted position as shown in FIG. 1A by a pair of spring members 81, shown in FIG. 4. A power supply 57 is mounted towards the rear of cabinet 17 and a fan 63 is mounted behind door 21, as shown in FIG. 5. Further, dimples 59 are formed on portions of the cabinet 17 which engage enclosing members, such as lid 19, or on the enclosing members, such as back panel 17', as shown more clearly in FIG. 5F. Such dimples 59 provide sufficient metal-to-metal contact between the cabinet 17 and the members, (i.e., lid 19 and back panel 17') to provide adequate radio frequency (RF) and electromagnetic interference (EMI) shielding between the components within the cabinet 17 and the surrounding outside environment.

Figure 7A:
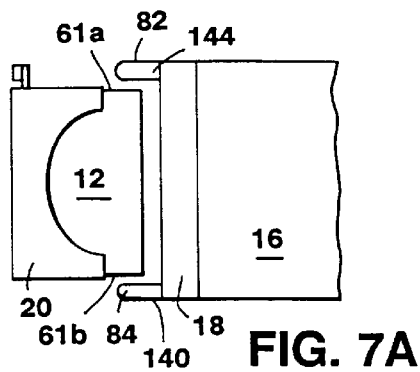
FIGS. 7A through 7D are diagrammatical sketches useful in understanding the process of removing a data cartridge from its associated carrier and transferring it into a drive mechanism by the drive mechanism's data cartridge transfer mechanism.
Figure 7B:
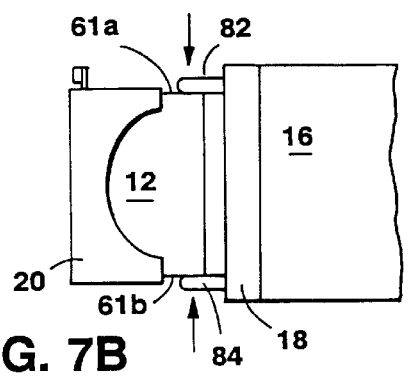
Figure 7C:
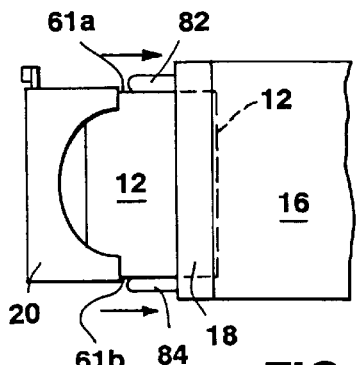
Figure 7D:
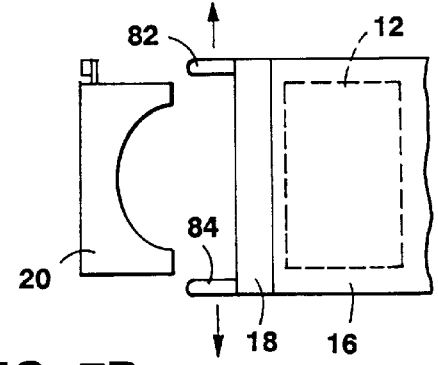

As noted above, and referring also to FIGS. 7 and 7A through 7D, each one of the drive mechanisms 16 has a transfer mechanism 18. The conveyor system 14 is adapted to position one of the data cartridges 12 at the transfer mechanism 18 of a selected one of the drive mechanisms 16, as shown in FIGS. 2, 7 and 7A. When so positioned, the transfer mechanism 18 includes a pair of opposing belts 82, 84 which are urged vertically towards each other to grasp opposing, upper and lower outer side portions 61a, 61b of the portion of the data cartridge 12 extending outwardly from the open end of its carrier 20 (FIG. 7B). The transfer mechanism 18 then rotates belt 82 clockwise in FIG. 7 and belt 84 counterclockwise in FIG. 7 to thereby withdraw the grasped data cartridge 12 from its carrier 20 (FIG. 7C) and then introduce the grasped cartridge 12 into the drive mechanism 16 (FIG. 7D). Once inside the drive mechanism 16, the data cartridge 12 may be processed. That is, data may be written onto the cartridge or data may be read from the data cartridge 12. The data cartridge 12 may then be withdrawn from the drive mechanism 16 by the transfer mechanism 18 after processing and returned to the carrier 20 using the reverse process.

Figure 8A:
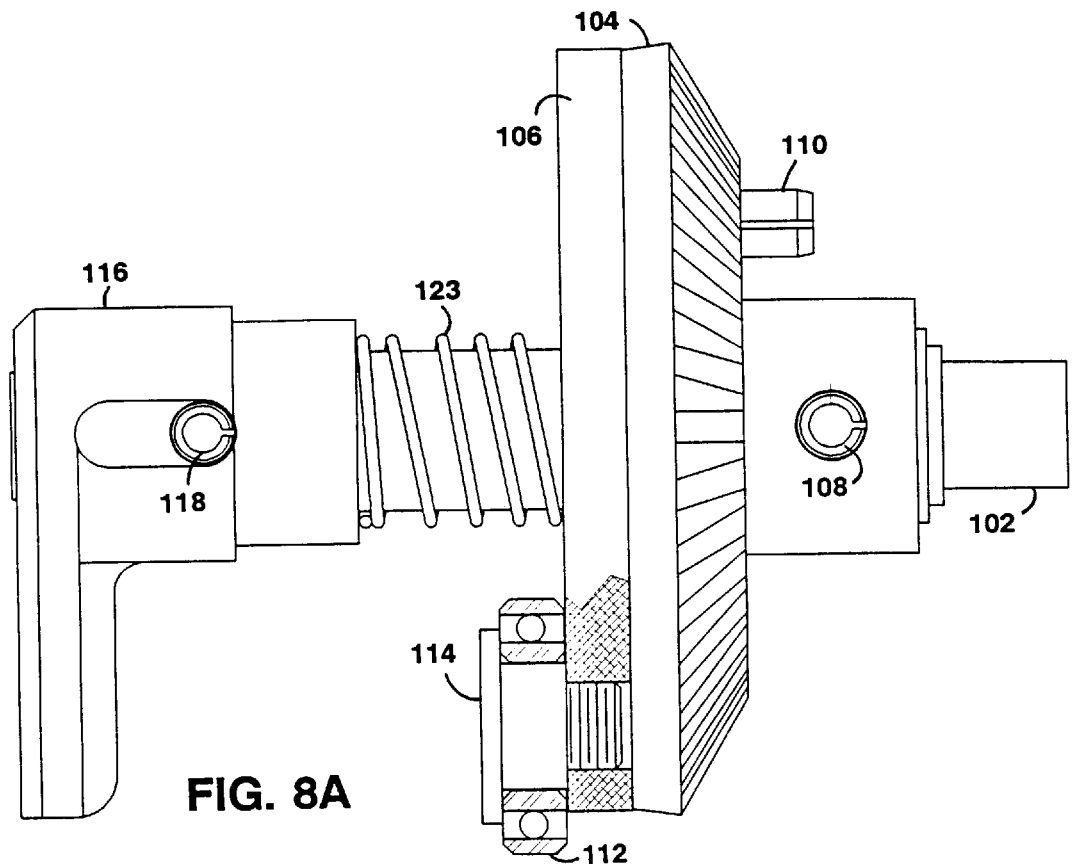
FIGS. 8A and 8B are side and front elevation views, respectively, of a bevel gear and cam used in the data cartridge transfer mechanism of FIG. 8.
Figure 8B:
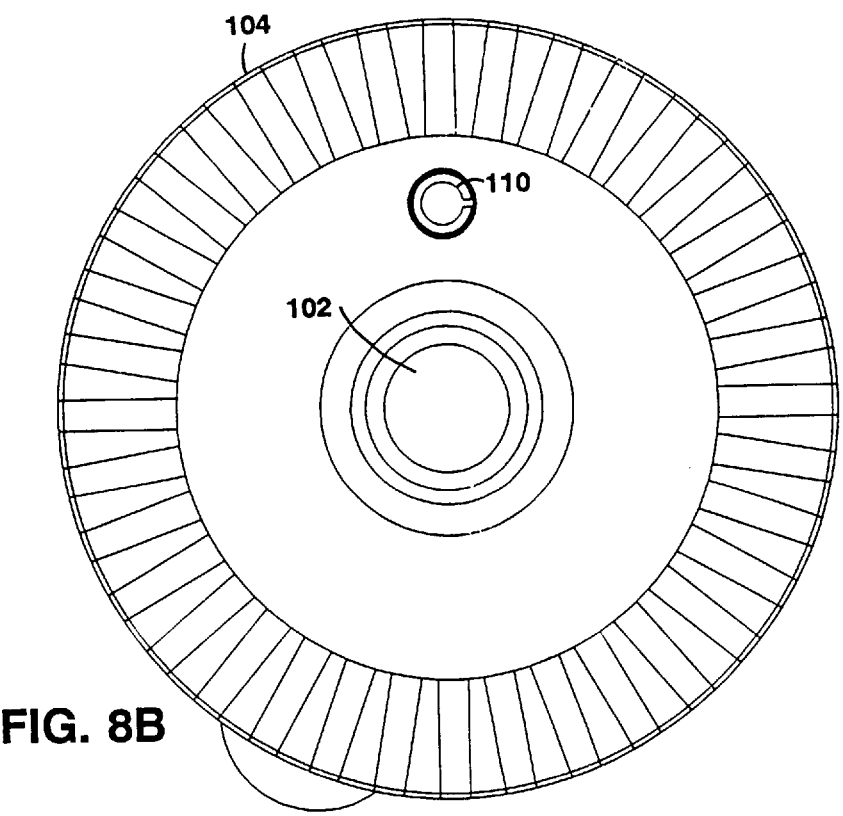

More particularly, and referring also to FIG. 8, the transfer mechanism 18 includes a printed circuit board 90 mounted to a side of the drive mechanism 16. Thus, because the transfer mecahnism 18, printed circuit board 90 and drive mecahnism are mounted together a modular structure is provided which may be inserted into, or removed from the cabinet 17 when lid 19 is opened, as described in connection with FIG. 1. Mounted to the printed circuit board 90 is a transfer mechanism 18 support 92. A reversible motor 94 is mounted to the support 92 by a bracket 96. A pair of gears 98, 100 is fixedly mounted to the shaft of the motor 94. Gear 100 is a bevel gear shown more clearly in FIGS. 9 and 12. (Gear 98 is shown more clearly in FIG. 12). A shaft 102 is rotatably mounted to support 92 by bearings 103, as shown. Shaft 102, as shown in FIGS. 8A and 8B, is connected to a gear mount 106 by a pin 108. A bevel gear 104 is fixed to gear mount 106 by a pin 110. Also connected to gear mount 106 is a bearing 112. The bearing 112 is eccentric to the longitudinal axis of shaft 102 and is affixed to the shaft 102 by screw 114. Also slidably mounted to shaft 102 is a cam 116. More particularly, the cam 116 is slidably captured to shaft 102 by pin 118. The shaft 102 passes though cam 116 and is rotatably mounted to the base of support 120 by bearing 122. Spring 123 (FIG. 8A) urges cam 116 away from gear mount 106 for reasons to be described hereinafter in connection with FIGS. 12A through 12H.

Bearing 112 is adapted to engage sloped surfaces 124, 126 of a spring loaded track output, here actuator 128. The sloped surfaces 124, 126 join at an apex 130, as shown more clearly in FIG. 10A. The actuator 128 is connected to a first rack 132. The teeth 133 of rack 122 are mounted to engage gear 134. Gear 134 is rotatably mounted to support 120 by bushing 136. Gear 134 is adapted to engage the teeth of a second rack 137. The second rack 137 is connected to belt support 140 through a block 142. The actuator 128 is connected to a second belt support 144. Belts 82, 84 (FIGS. 7 and 8) are stretched around drive pulleys 160, 154 respectively, as shown. Here, the drive belts 82, 84 are each made of a pair of layers 83o, 83i (FIG. 10D) of the same material. Here each layer 83o, 83i is urethane; however, the outer layer 83o has a lower degree of harness (durometer number) than the inner layer 83i. That is, the outer layer 83o which contacts the sides 61a, 61b of the data cartridge 12 has a degree of friction that the inner layer 83i which contacts drive pulleys 160, 154. Here, the Shore number of the inner layer 83i is "A 90" while the Shore number of the outer layer 83o is "A 40". Thus, the inner layer 83i is hard enough to resist deformation, or stretching, after extended use, while the outer layer 83o provides the requisite frictional force to the data cartridge 12.

Figure 11A:
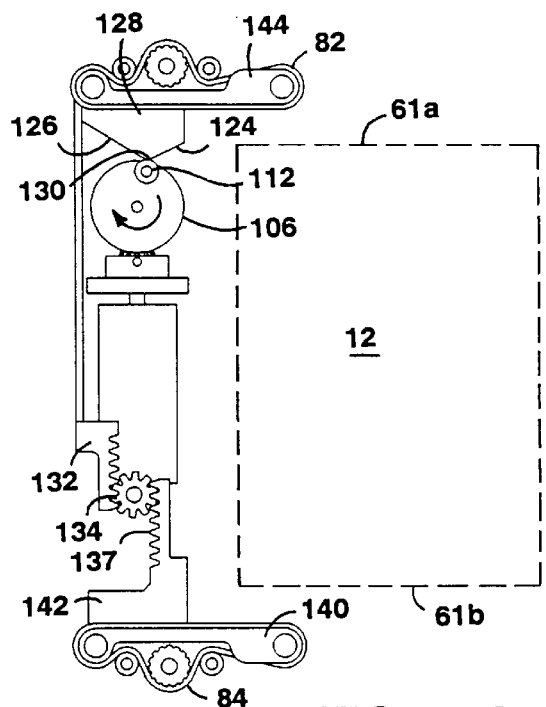
Figure 11B:
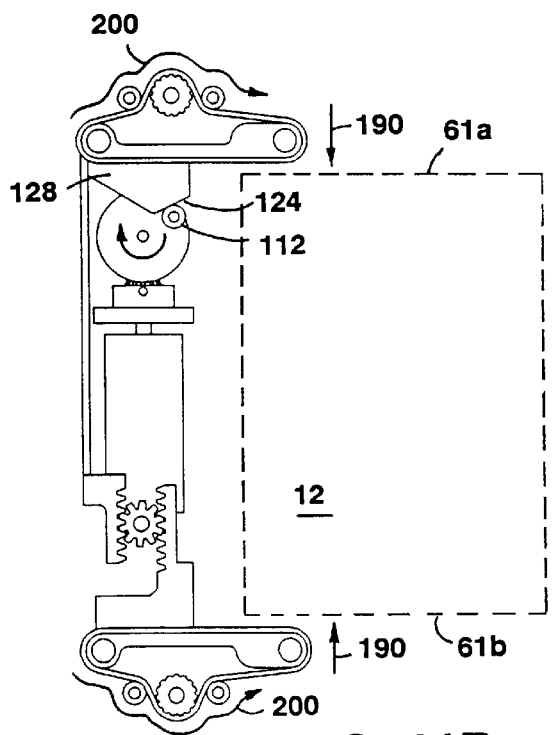
Figure 11C:
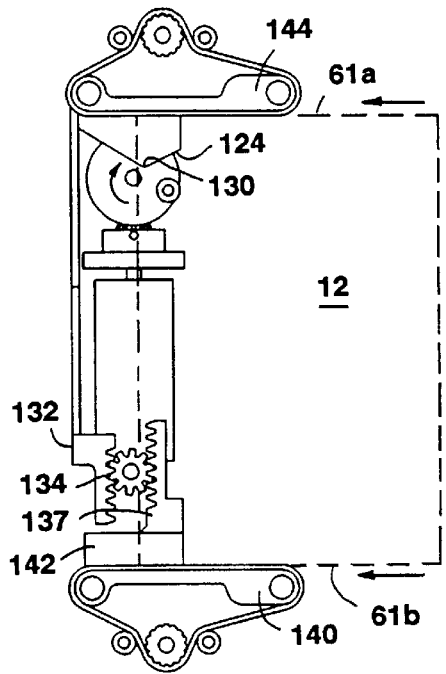

A pair of idler pulleys 146, 148 are rotatably connected to belt support 140. Likewise, a pair of idler pulleys 150, 152 are rotatably connected to belt support 144. A drive pulley 154 is connected by pin 156 to a shaft 158. Likewise, drive pulley 160 is connected by pin 162 to a shaft 164. Belts 82, 84 (FIGS. 6 and 8) are stretched around drive pulleys 154, 160, respectively, as shown, and around idle pulleys 146, 148 and 150, 152, respectively, as shown. Also connected to shafts 158, 164 are miter gears 166, 168, respectively. Miter gears 166, 168 are arranged to engage gears 180, 182. Gears 180, 182 are connected to shaft 172 by pins 180a, 182a (FIG. 8). Gear 170 is also connected to shaft 172 by pin 174. The end plates 175, 176 are connected to the drive mechanism 16. Positioned between gear 182 and block 142 is a spring 184. Likewise, positioned between gear 180 and actuator 128 is a spring 185. The shaft 172 is held between sides of support 120 and is rotatably mounted to such support 120 by bearings 186, 188. It should be noted that springs 184, 185 urge the actuator 128 (and therefore belt drive support 144) and block 142 (and therefore belt drive support 140) laterally towards each other through the action of racks 132, 137 and gear, i.e., pinion, 134 (FIGS. 10A, 10B, 11A, 11B and 11C) to their fully "closed" position as shown in FIGS. 10B, 11C. This lateral motion is limited by engagement with the sides 61a, 61b of the data cartridge 12, as shown in FIGS. 7B and 11C. The belt drive supports 140, 144 are driven to their normal, fully open position, as shown in FIGS. 10A, 11A, when the motor 94 drives bearing 112 to the apex 130 of actuator 128, as shown in FIG. 10A. The sequence of removing a data cartridge 12 is shown in detail in FIGS. 11A through 11H, respectively, as the bevel gear 104 and gear mount 106 are rotated in the direction shown by the arrow, i.e., here rotated clockwise.

Figure 9:
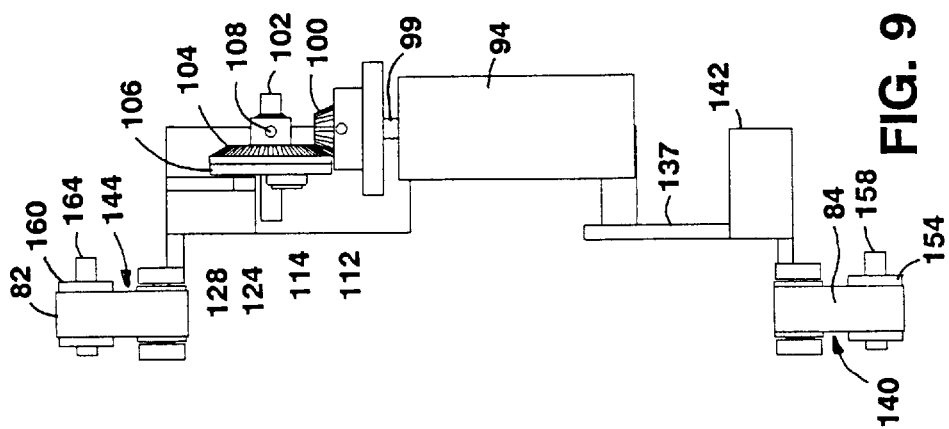
FIG. 9 is a diagrammatical sketch of a side view of a portion of the data cartridge transfer mechanism of FIG. 8, such sketch being useful in understanding vertical motion of a pair of belt supports of the data cartridge transfer mechanism of FIG. 8.

More particularly, when assembled, bevel gear 104 is engaged with bevel gear 100, as shown in FIG. 9. Further, the belt supports 140, 144 are normally in a fully opened position (i.e., have a maximum vertical separation between them as shown in FIGS. 5, 7A, 10A and 11A) to enable the portion of the data cartridge 12 extending outwardly from its carrier 20 to pass between such belt supports 140, 144 as the conveyor system 14 rotates the carriers 20 to a desired position opposite a transfer mechanism 18. That is, the bearing 112 is positioned at the apex 130 of actuator 112 (FIGS. 10A, 11A).

When a selected data cartridge 12 is positioned in front of one of the drive mechanisms 16 selected to process such data cartridge 12, the transfer mechanism 18 motor 94 rotates in the, here clockwise direction (FIG. 11A). In response to such motor 94 rotation, gear 104 rotates clockwise and bearing 112 moves down the sloped surface 124 of actuator 128 as such actuator 128 is urged by spring 184 inwardly towards block 142, as shown in FIG. 10B. Thus, when actuator 128 is urged inwardly by spring 184 towards block 142, belt support 144 moves in the direction indicated by arrows 189 in FIG. 10A, rack 132 rotates gear 134 which, in turn, moves block 142, and hence belt support 140 inwardly, as shown by the arrow 190, in FIGS. 10B and 11B. It is noted that shafts 158, 164 are rotatably mounted to support 120 and base 178, the shafts are laterally stationary relative to frame 120 and base 178. Therefore, the belt supports 140, 144 are forced towards each other until the belts 82, 84 engage the sides 61a, 61b of the data cartridge 12 (FIG. 11C). Thus, the belts 82, 84 grasp onto the data cartridge 12 as shown in FIGS. 7B, 11C.

Figure 11D:
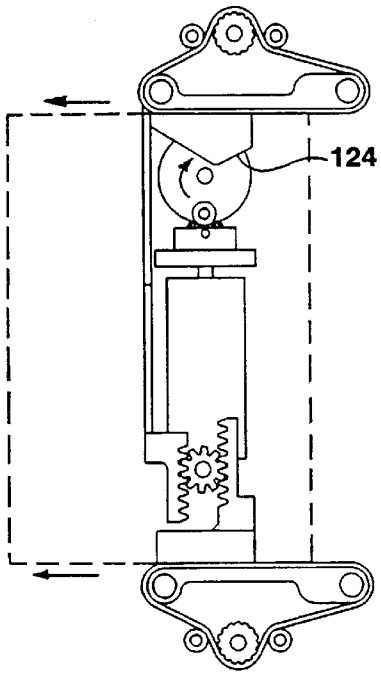

Further, gear 98, which is engaged with gear 170, as shown more clearly in FIG. 12, rotates shaft 172 and therefore gears 180, 182. Gears 180, 182 rotate gears 166, 168 which rotate shafts 158, 164 and therefore drive pulleys 154, 160. Drive pulleys 154, 160 drive belts 82, 84, respectively, in the directions shown by the arrows 200, as shown in FIGS. 10B and 11B. Thus, while the transfer mechanism motor 94 continues to rotate in the first direction, data cartridge 12 is drawn out from the data cartridge carrier 20 and into the selected drive mechanism 16, as shown in FIGS. 7C, 11C and 11D. It is noted that after the belts 82, 84 engage the sides 61a, 61b of the data cartridge 12, as the gear 104 continues to rotate clockwise, bearing 112 leaves surface 124. The gear 104 continues to rotate clockwise, as shown in FIG. 11C through 11H. It is noted that after the data cartridge 12 is fully inserted into the drive mechanism 16 (FIG. 11G), the bearing 112 engages slopped surface 126 as bevel gear 104 continues to rotate clockwise. As the bevel gear 104 rotates further clockwise, bearing 112 again urges belt drive supports 140, 144 apart as shown by arrows 189' as shown in FIG. 11G until pin 110 is returned to the apex 130 as shown in FIG. 11H. It is noted that the end of shaft 172 (FIG. 12) is provided with a slot 187 for receiving a screw driver, not shown. Thus, if there is a failure in the transfer mechanism 18, the data cartridge 12 may be manually removed by turning shaft 172 with a screw driver.

Figure 12A:
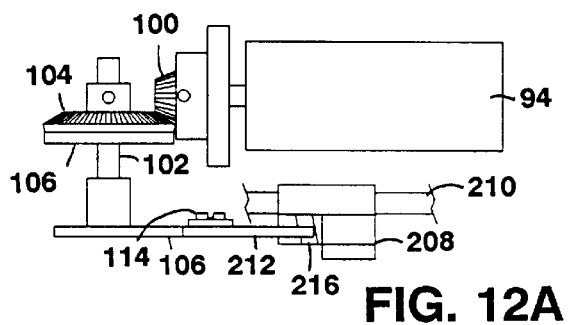
Figure 12B:
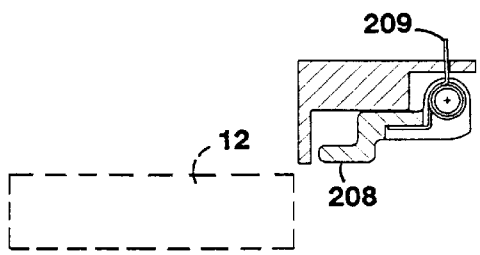
Figure 12C:
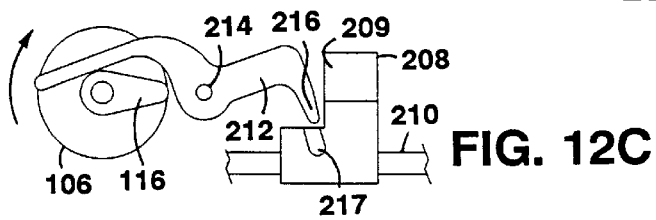
Figure 13A:
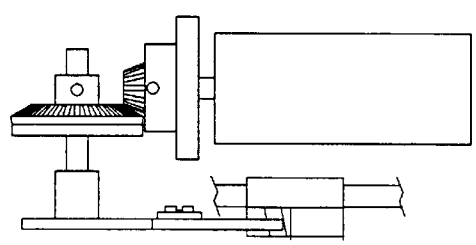
Figure 13B:
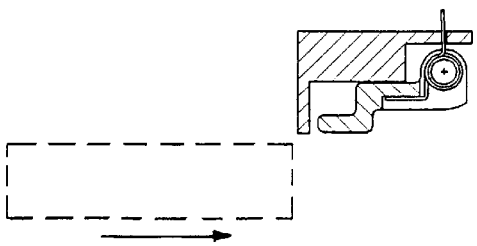
Figure 13C:
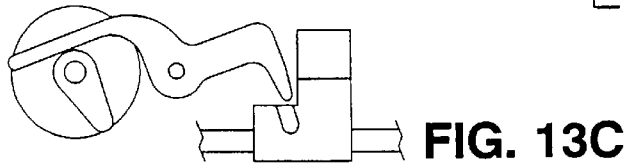
Figure 14A:
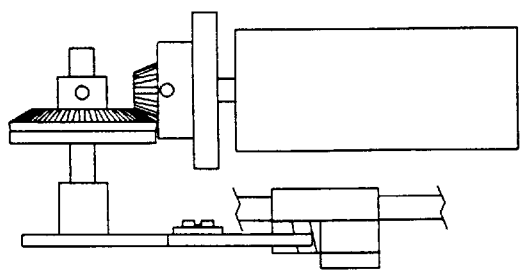
Figure 14B:
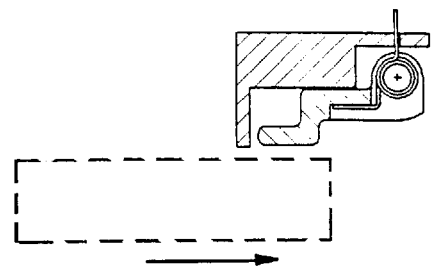
Figure 14C:
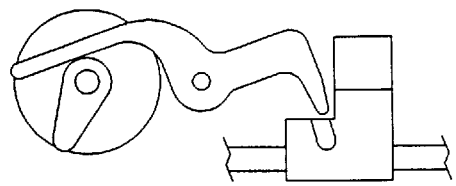

In order to force the data cartridge 12 fully into the drive mechanism 16, a mechanical finger 208 (FIGS. 8, 8C, 8D and 8E) is provided. Finger 208 is held to shaft 210 by a circular spring 209 (FIG. 8), as shown in FIG. 8F. Finger 208, when forced by the motion of tip 216 of cam follower 212 in response to cam 116, rotates finger 208 on shaft 210, which is rotatably mounted to support 120, in a manner to be described in connection with a sequence of FIGS. 12A–12C through 19A–19C, respectively. More particularly, FIGS. 12A–12C show the position of finger 208 and data cartridge 12 at a position corresponding to FIG. 11A. When shaft 102 rotates in response to motor 94 rotating in the first direction, cam 116 rotates cam follower 212 clockwise in FIG. 12A which is rotatably mounted to support 120 by a bearing 214, as noted above. FIG. 20A also shows the position of cam 116 and cam follower 212 as they are positioned in FIGS. 12A, 12B and 12C. It is noted that cam 116 is elevated above cam follower 212 by a riser 230 formed on support 120 (FIGS. 8, 20A).

Figure 16A:
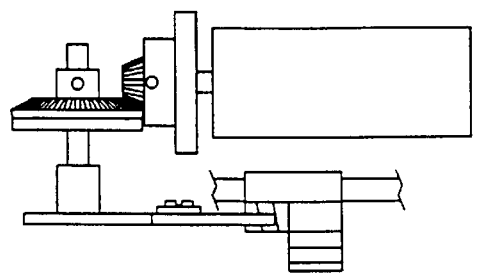

FIGS. 13A–13C through FIGS. 19A–19C, show the position of the finger 208 and data cartridge 12 at positions corresponding to FIGS. 11B through 11H, respectively. During insertion of the data cartridge 12 into the drive mechanism, cam 116 rotates in the direction of arrow 231 in FIGS. 20A through 20D. The cam 116 is forced off riser 230 by the spring 123 (FIGS. 8A, 20B). Thus, the cam 116, now being on the same level as cam follower 212, engages cam follower 212 as shown in FIG. 20D as the tip 216 of cam follower 212 enters slot 217, as shown in FIG. 16A. Now, so engaged, camming action occurs between cam 116 and cam follower 212 with the result that mechanical finger 208 completes insertion of the data cartridge 12 into the drive mechanism 16, as shown in connection with FIGS. 16B and 17B.

Figure 15A:
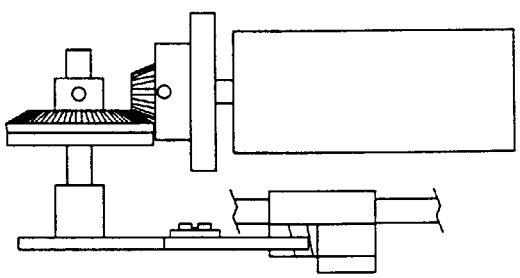
Figure 15B:
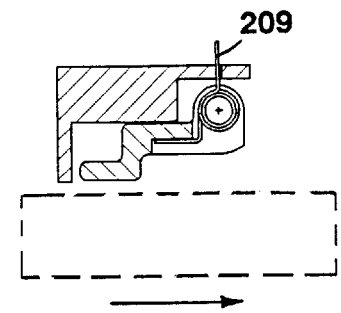
Figure 15C:
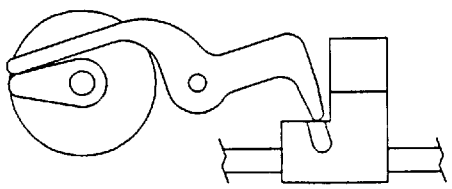
Figure 16B:
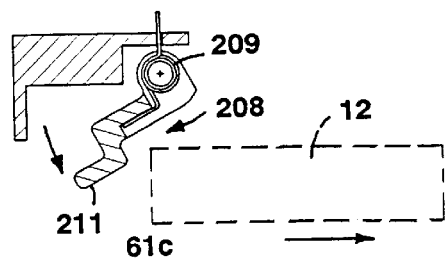
Figure 16C:
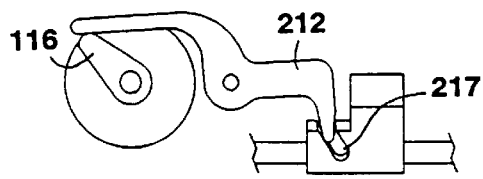
Figure 17A:
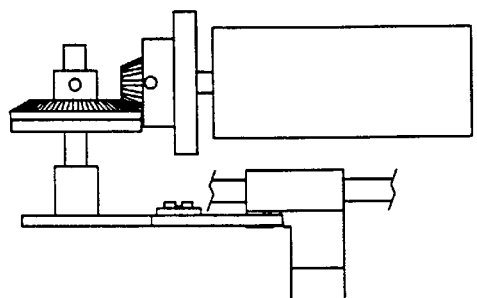
Figure 17B:
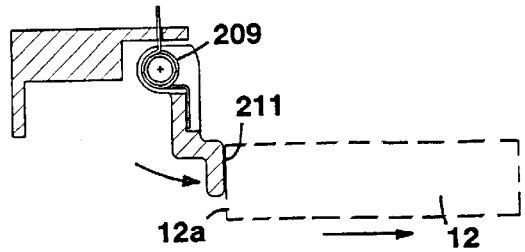
Figure 17C:
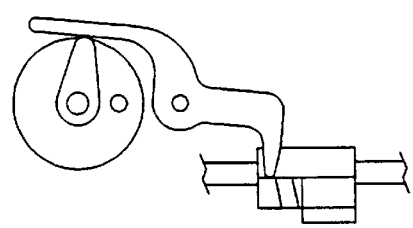
Figure 18A:
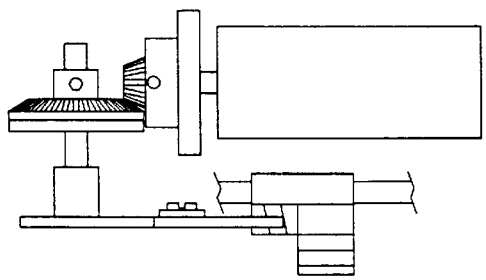
Figure 18B:
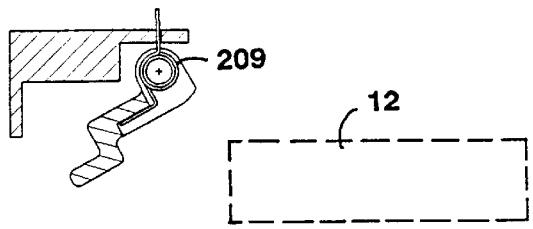
Figure 18C:
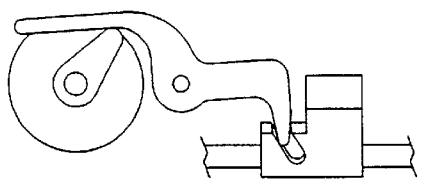
Figure 19A:
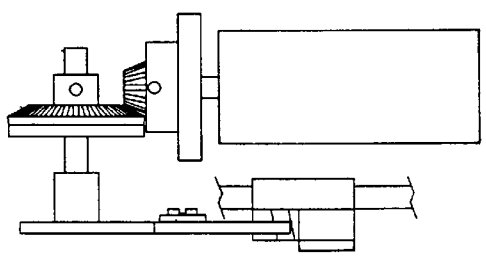
Figure 19B:
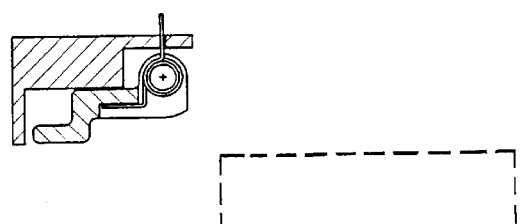
Figure 19C:
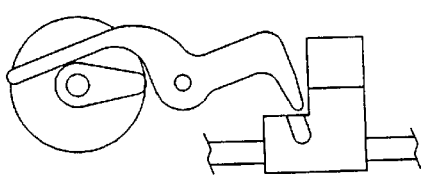

More particularly, as noted in FIGS. 16A–16C, after nearly all of the data cartridges 12 has been inserted into the drive mechanism 16, at which point the belts 82, 84 are no longer in contact with the cassette 12, tip 216 begins to enter slot 217. FIGS. 15A–15C show conditions where tip 216 of cam follower 212 pulls against a sloped surface 219 formed in slot 217 to thereby rotate the back surface 219 downward in FIG. 15B against the rear surface 61c of the data cartridge 12 and thereby complete insertion of data cartridge 12 into the drive mechanism 16 as shown in FIG. 17B. It should be noted that the rotation of the finger 208 (counter-clockwise in FIGS. 16B and 16C) is in a direction which compresses spring 209 (FIG. 8, 8F, 8G, 8H, 15B and 16B).

As gear 104 continues to rotate clockwise, the spring 209 (FIGS. 8, 8F and 17B) decompresses and thereby forces the finger 208 to return to its initial position, as shown in FIGS. 19A, 19B, 19C and 20C.

After processing by the drive mechanism 16, the direction of rotation of the transfer mechanism motor 94 reverses, the data cartridge 12 is withdrawn from the drive mechanism 16 and inserted into its carrier 20 by the belts 82, 84 rotating in a reverse direction and the actuator 128 and block 142 are returned to their normal, fully opened position as shown in FIG. 11A. It should be noted that cam 116 returns to rest on top of riser 230 (FIG. 20E). Thus, as the motor 94 reverses direction, as shown by arrow 231, cam 116 slides on top of cam follower 212 (FIG. 20F) so that there is no camming action as the data cartridge 12 is removed from the drive mechanism 16. Thus, the mechanical finger 208 will not interfere with the removal of the data cartridge 12 from the drive mechanism 16. (It should be noted that the drive mechanism 16 is a conventional drive mechanism and when the tape cassette type data cartridge 12 is ejected, a spring mechanism, not shown, in the tape drive propels the data cartridge 12 from the drive mechanism 16 where it is then grasped by the belts 82, 84 (FIG. 12) for removal and return to the carrier 20 described above (FIG. 4A).

Referring now also to FIG. 10C, it should be noted that gears 98 and 100 are part of a clutch mechanism 101. The gear 100 is affixed to a hub 105 by a pin 107, as shown. It is noted that the pin 107 is attached to the shaft 99 of motor 94. A spring washer 111 forces gear 98 against a friction disk 109. The friction disk 109 is captured, or sandwitched, between gear 98 and hub 105. Thus, when a data cartridge 12 is fully seated back into the carrier 20, the clutch mechanism 101 "slips". That is, gear 100 continues to rotate while gear 98 stalls thereby allowing gear 100 to continue to rotate until belt supports 140, 144 return to the fully open position (FIG. 11A, 11H).

Referring now to FIG. 21, cabinet 17 is shown to have a lower slidable drawer 300. The drawer 300 is adapted to support a variety of small computer peripherals, i.e, including quarter inch cartridges, optical disk a pair of hard drives, four millimeter Digital Audio Tape (DAT) and eight millimeter tape, for example. The storage device, or devices, on drawer 300 is adapted for electrical connection to the drive mechanisms 16 to enable data to be a cassette in the tape drive and the storage device on the drawer 300.

Other embodiments are within the spirit and scope of the claims. For example, while a pair of belts 22, 24 are used, a single belt may be used. Also while one spring 72 has been shown, a second, upper mounted spring may be used.

What is claimed is:

1. A system for storing and retrieving data, such system comprising:

a cabinet having a linear region therein;

a conveyor system adapted for slidable insertion into and removal from an opening in the cabinet, for holding data cartridges in a continuous closed loop arrangement, such loop being substantially linear along the linear region in the cabinet when the conveyor is disposed within the cabinet;

a plurality of independently operable drive mechanisms disposed along the linear region; and wherein each one of the drive mechanisms has an associated data cartridge transfer mechanism for transferring a data cartridge between the conveyor system and one of the drive mechanisms;

wherein each one of the data cartridge transfer mechanism includes: a finger member for forcing the data cartridge fully into the drive mechanism; and wherein each one of the data cartridge transfer mechanisms is adapted to engage one of the data cartridges in the conveyor system and retract said one of the data cartridges from the conveyor system and insert such retracted data cartridge into the associated one of the drive mechanisms and to engage a data cartridge in the associated drive mechanism and transport such data cartridge to the conveyor system.

2. A system for storing and retrieving data, such system comprising:

a conveyor system for carrying a plurality of data cartridges;

a plurality of independently operable drive mechanisms; and wherein each one of the drive mechanisms has an associated data cartridge transfer mechanism for transferring a data cartridge between the conveyor system and one of the drive mechanisms;

wherein each one of the data cartridge transfer mechanism includes: a finger member for forcing the data cartridge fully into the drive mechanism; and wherein each one of the data cartridge transfer mechanisms is adapted to engage one of the data cartridges in the conveyor system and retract said one of the data cartridges from the conveyor system and insert such retracted data cartridge into the associated one of the drive mechanisms and to engage a data cartridge in the associated drive mechanism and transport such data cartridge to the conveyor system; and wherein each one of the data cartridge transfer mechanism includes:
   a reversible motor;
   a pair of vertically opposed belt supports;
   a pair of belts carried by the belt supports; and,
   a drive mechanism coupled between the motor, the belts and belt supports, such drive mechanism being mechanically coupled to the pair of vertically opposed belt supports and belts mounted to the belt supports; and
   wherein the drive mechanism is coupled to change the vertical separation between the belt supports and drive the belts, the belt supports being changed between a normally, fully opened position to enable a portion of vertically positioned data cartridges extending outwardly from a carrier to pass between such supports as the conveyor system rotates the carriers to a desired position, and when a selected data cartridge is positioned in front of one of the drive mechanism selected to process such data cartridge, the transfer mechanism motor rotates in a first direction and, in response to such motor rotation, the belt supports being driven by the motor vertically towards each other until the belts thereon grasp the exposed sides of the selected data cartridge.

3. The system recited in claim 2 wherein the drive mechanism is arranged to, concurrently with changing the separation between the belt supports, drive the belts to rotate in a direction while the transfer mechanism motor continues to rotate in the first direction to draw the grasped data cartridge out of its carrier and into the selected drive mechanism.

4. The system recited in claim 3 wherein the drive mechanism is arranged to, after processing by the drive mechanism, reversing the direction of rotation of the transfer mechanism motor to withdraw the data cartridge from the drive mechanism and insert it into its carrier by the belts rotating in a reverse direction.

5. The system recited in claim 4 wherein the drive mechanism is arranged to, while the motor continues to rotate in the reverse direction, move the belt holders vertically apart and return them to their normal, fully opened position.

6. The system recited in claim 1 wherein each one of the data cartridge transfer mechanisms is adapted to engage opposing surfaces of the engaged data cartridge in transferring such data cartridge between the associated drive mechanism and the conveyor system.

7. A system for storing and retrieving data, such system comprising:

a conveyor system for holding data cartridges in a continuous closed loop arrangement, such loop having a substantially linear region;

a plurality of independently operable drive mechanisms disposed along the linear region; and wherein each one of the drive mechanisms has an associated data cartridge transfer mechanism for transferring a data cartridge between the conveyor system and one of the drive mechanisms;

wherein each one of the data cartridge transfer mechanism includes: a finger member for forcing the data cartridge fully into the drive mechanism; and wherein each one of the data cartridge transfer mechanisms is adapted to engage one of the data cartridges in the conveyor system and retract said one of the data cartridges from the conveyor system and insert such retracted data cartridge into the associated one of the drive mechanisms and to engage a data cartridge in the associated drive mechanism and transport such data cartridge to the conveyor system.

8. The system recited in claim 7 wherein each one of the data cartridge transfer mechanism includes:
   a reversible motor;
   a pair of vertically opposed belt supports;
   a pair of belts carried by the belt supports; and,
   a drive mechanism coupled between the motor, the belts and belt supports, such drive mechanism being mechanically coupled to the pair of vertically opposed belt supports and belts mounted to the belt supports; and wherein the drive mechanism is coupled to change the vertical separation between the belt supports and drive the belts, the belt supports being changed between a normally, fully opened position to enable a portion of vertically positioned data cartridges extending outwardly from a carrier to pass between such supports as the conveyor system rotates the carriers to a desired position, and when a selected data cartridge is positioned in front of one of the drive mechanism selected to process such data cartridge, the transfer mechanism motor rotates in a first direction and, in response to such motor rotation, the belt supports being driven by the motor vertically towards each other until the belts thereon grasp the exposed sides of the selected data cartridge.

9. The system recited in claim 8 wherein the drive mechanism is arranged to, concurrently with changing the separation between the belt supports, drive the belts to rotate in a direction while the transfer mechanism motor continues to rotate in the first direction to draw the grasped data cartridge out of its carrier and into the selected drive mechanism.

10. The system recited in claim 9 wherein the drive mechanism is arranged to, after processing by the drive mechanism, reversing the direction of rotation of the transfer mechanism motor to withdraw the data cartridge from the drive mechanism and insert it into its carrier by the belts rotating in a reverse direction.

11. The system recited in claim 10 wherein the drive mechanism is arranged to, while the motor continues to rotate in the reverse direction, move the belt holders vertically apart and return them to their normal, fully opened position.

12. The system recited in claim 7 wherein each one of the data cartridge transfer mechanisms is adapted to engage opposing surfaces of the engaged data cartridge in transferring such data cartridge between the associated drive mechanism and the conveyor system.

* * * * *